(12) United States Patent
Lu et al.

(10) Patent No.: US 11,880,113 B2
(45) Date of Patent: *Jan. 23, 2024

(54) VARIFOCAL SYSTEM USING HYBRID TUNABLE LIQUID CRYSTAL LENSES

(71) Applicant: Meta Platforms Technologies, LLC, Menlo Park, CA (US)

(72) Inventors: Lu Lu, Kirkland, WA (US); Fenglin Peng, Redmond, WA (US); Douglas Robert Lanman, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,085

(22) Filed: May 3, 2022

(65) Prior Publication Data

US 2022/0260887 A1 Aug. 18, 2022

Related U.S. Application Data

(63) Continuation of application No. 16/271,344, filed on Feb. 8, 2019, now Pat. No. 11,353,767.

(60) Provisional application No. 62/712,001, filed on Jul. 30, 2018.

(51) Int. Cl.
*G02F 1/29* (2006.01)
*G02B 30/36* (2020.01)

(52) U.S. Cl.
CPC ............ *G02F 1/29* (2013.01); *G02B 30/36* (2020.01); *G02F 1/294* (2021.01)

(58) Field of Classification Search
None
See application file for complete search history.

(56) References Cited

U.S. PATENT DOCUMENTS

| | | | |
|---|---|---|---|
| 10,248,001 B1* | 4/2019 | Lu | G02B 3/14 |
| 10,379,419 B1* | 8/2019 | Lu | G02B 27/286 |
| 10,534,185 B1* | 1/2020 | Lee | G06F 3/013 |
| 2004/0108971 A1* | 6/2004 | Waldern | G02B 27/017 |
| | | | 345/8 |
| 2004/0164927 A1* | 8/2004 | Suyama | G02B 30/52 |
| | | | 345/32 |

(Continued)

FOREIGN PATENT DOCUMENTS

CN 108292041 A 7/2018

OTHER PUBLICATIONS

Extended European Search Report for European Application No. 19843455.7, dated Aug. 4, 2021, 10 Pages.

(Continued)

*Primary Examiner* — Ryan Crockett
(74) *Attorney, Agent, or Firm* — MILLBURN IP PLLC

(57) ABSTRACT

A device includes a first-type liquid crystal (LC) lens configured to provide a first optical power that is variable in a first step resolution. The device also includes a second-type LC lens coupled with the first-type LC lens, and configured to provide a second optical power that is variable in a second step resolution. The first step resolution is smaller than the second step resolution. A total optical power of the device is a sum of the first optical power and the second optical power, and is variable in the first step resolution.

10 Claims, 16 Drawing Sheets

(56) References Cited

U.S. PATENT DOCUMENTS

| | | | | |
|---|---|---|---|---|
| 2006/0114534 | A1* | 6/2006 | Batchko | G02F 1/29 359/15 |
| 2007/0058904 | A1* | 3/2007 | Ban | G02B 6/4204 385/52 |
| 2009/0174918 | A1* | 7/2009 | Zhuang | G02B 5/32 359/19 |
| 2014/0022619 | A1* | 1/2014 | Woodgate | G02B 27/0093 359/240 |
| 2015/0323803 | A1* | 11/2015 | Tung | G02B 30/25 359/465 |
| 2016/0109652 | A1* | 4/2016 | Schowengerdt | G02F 1/0105 385/24 |
| 2017/0199236 | A1 | 7/2017 | Davies | |
| 2017/0270637 | A1* | 9/2017 | Perreault | G02B 26/0808 |
| 2018/0059297 | A1* | 3/2018 | Peroz | H04N 9/3102 |
| 2018/0188631 | A1* | 7/2018 | Lu | G02B 5/30 |
| 2018/0284464 | A1* | 10/2018 | Lu | G02F 1/29 |
| 2018/0356639 | A1* | 12/2018 | Schaefer | G02B 27/0172 |
| 2019/0129178 | A1* | 5/2019 | Patterson | G02B 6/0076 |
| 2019/0227375 | A1* | 7/2019 | Oh | G02F 1/133528 |
| 2019/0278152 | A1* | 9/2019 | Wang | G02F 1/29 |
| 2020/0348528 | A1* | 11/2020 | Jamali | G02B 27/28 |

OTHER PUBLICATIONS

International Search Report and Written Opinion for International Application No. PCT/US2019/017453, dated May 30, 2019, 15 Pages.

Jamali A., et al., "A Continuous Variable Lens System to Address the Accommodation Problem in VR and 3D Displays," Society for Information Display Symposium Digest of Technical Papers, May 2018, vol. 49 (1), pp. 1721-1724.

Notification of the First Office Action dated Dec. 31, 2021 for Chinese Application No. 201980040939.1, filed Feb. 11, 2019, 9 pages.

* cited by examiner (Real World)

(3D Display)

| Time | | T1 (t0≤t<t1) | t1 | T2 (t1<t<t2) | t2 | T3 (t2<t<t3) | t3 | T3 (t3<t<t4) | t4 |
|---|---|---|---|---|---|---|---|---|---|
| Stacked LC lens structure | First LC lens 430 | 0→R | 0 | 0 | 0 | 0→R | 0 | 0 | 0 |
| | Second LC lens 440 | 0 | 0 | 0→R | 0 | 0 | 0 | 0→R | 0 |
| Stacked PBP LC lens structure 480 | AE 421 | A | A | A | A | A | A | A | A |
| | AE 423 | 0 | R | R | R | R | R | R | R |
| | AE 425 | 0 | 0 | 0 | R | R | R | R | R |
| | AE 427 | 0 | 0 | 0 | 0 | 0 | R | R | R |
| | AE 429 | 0 | 0 | 0 | 0 | 0 | 0 | 0 | R |
| Total optical power | | A →A+R | A+R | A+R →A+2R | A+2R | A+2R →A+3R | A+3R | A+3R →A+4R | A+4R |

| Time | | T1 (t0≤t<t1) | t1 | T2 (t1<t<t2) | t2 | T3 (t2<t<t3) | t3 | T3 (t3<t<t4) | t4 |
|---|---|---|---|---|---|---|---|---|---|
| Stacked LC lens structure | First LC lens 430 | R→0 | 0 | 0 | 0 | 0→-R | 0 | 0 | 0 |
| | Second LC lens 440 | 0 | 0 | R→0 | 0 | 0 | 0 | R→0 | 0 |
| Stacked PBP LC lens structure 480 | AE 421 | A | A | A | A | A | A | A | A |
| | AE 423 | -R | -R | -R | -R | -R | -R | -R | -R |
| | AE 425 | 0 | 0 | -R | -R | -R | -R | -R | -R |
| | AE 427 | 0 | 0 | 0 | 0 | -R | -R | -R | -R |
| | AE 429 | 0 | 0 | 0 | 0 | 0 | 0 | -R | -R |
| Total optical power | | A →A-R | A-R | A-R →A-2R | A-2R | A-2R →A-3R | A-3R | A-3R →A-4R | A-4R |

US 11,880,113 B2

VARIFOCAL SYSTEM USING HYBRID TUNABLE LIQUID CRYSTAL LENSES

CROSS REFERENCE TO RELATED APPLICATIONS

This application is a continuation of U.S. patent application Ser. No. 16/271,344, entitled "VARIFOCAL SYSTEM USING HYBRID TUNABLE LIQUID CRYSTAL LENSES," filed on Feb. 8, 2019, which claims the benefit of U.S. Provisional Application No. 62/712,001, filed Jul. 30, 2018. Contents of the above-mentioned applications are incorporated herein by reference in their entirety.

BACKGROUND

The present disclosure generally relates to display technologies and, specifically, relates to a varifocal system based on hybrid tunable crystal lenses.

Virtual reality (VR) headsets can be used to simulate virtual environments. For example, stereoscopic images can be displayed on an electronic display inside a headset to simulate the illusion of depth, and head tracking sensors can be used to estimate what portion of the virtual environment is being viewed by the user. However, because existing headsets are often unable to correctly render or otherwise compensate for vergence and accommodation conflicts, such simulation can cause visual fatigue and nausea of the users.

Augmented Reality (AR) headsets display a virtual image overlapping with real world images. To create comfortable viewing experience, the virtual image generated by the AR headsets needs to be displayed at the right distance for the eye accommodations of the real world images in real time during the viewing process.

BRIEF SUMMARY OF THE DISCLOSURE

One aspect of the present disclosure provides a varifocal system. The varifocal system comprises a stacked first-type liquid crystal (LC) lens structure and a stacked second-type LC lens structure in optical series. The stacked first-type LC lens structure includes a plurality of first-type LC lenses, and a first-type LC lens of the plurality of first-type LC lenses provides continuously variable optical states in a first step resolution. The stacked second-type LC lens structure includes a plurality of second-type LC lenses, and provides a plurality of optical states in a second step resolution. The first step resolution is smaller than the second step resolution, such that when the stacked second-type LC lens structure is switched between two optical states, the first-type LC lenses provide a continuous adjustment of optical power between the two optical states. The stacked first-type LC lens structure and the stacked second-type LC lens structure together provide a continuous adjustment range of optical power for the varifocal system.

Another aspect of the present disclosure provides a driving method for a varifocal system. The driving method comprises: stacking a plurality of first-type liquid crystal (LC) lenses to form a stacked first-type LC lens structure, wherein a first-type LC lens of the plurality of first-type LC lenses provides continuously variable optical states in a first step resolution; stacking a plurality of second-type LC lenses to form a stacked second-type LC lens structure arranged in optical series with the stacked first-type LC lens structure, wherein the stacked second-type LC lens structure provides a plurality of optical states in a second step resolution, and the second step resolution is larger than the first step resolution; determining a current optical state of the varifocal system; determining a next optical state required by the varifocal system in terms of the first step resolution and the second step resolution; switching the first-type LC lenses to provide a continuous adjustment of optical power to achieve the next optical state in terms of the first step resolution; and switching the stacked second-type LC lens structure to achieve the next optical state in terms of the second step resolution, such that the stacked first-type LC lens structure and the stacked second-type LC lens structure together provide a continuous adjustment range from the current optical state to the next optical state for the varifocal system.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
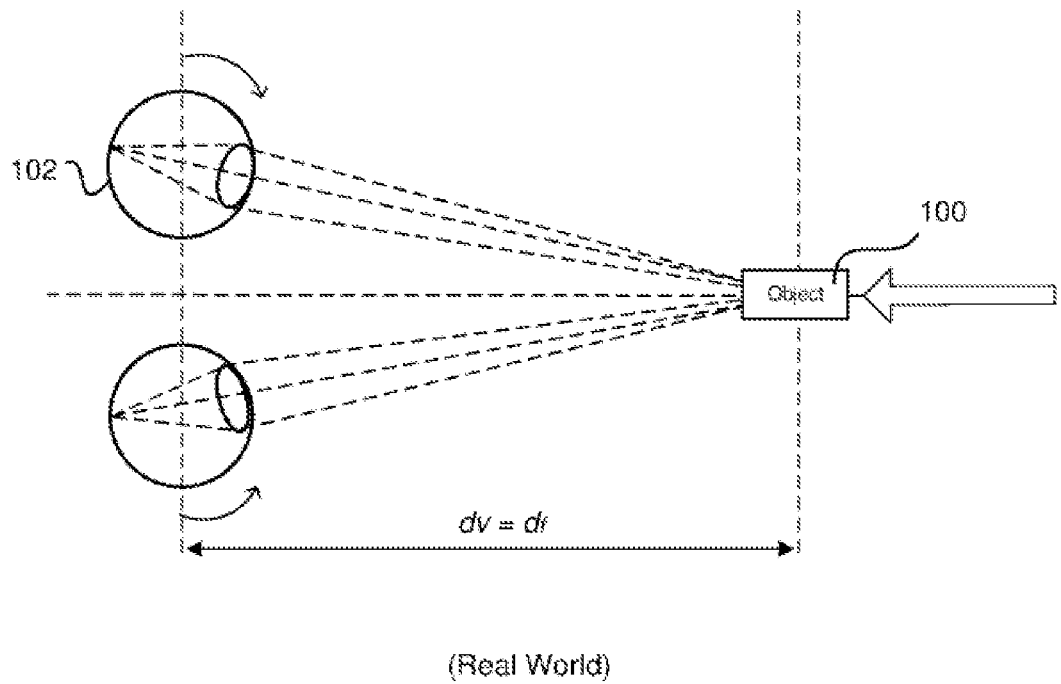
FIG. 1A shows the relationship between vergence and eye focal length in the real word of the present disclosure.

A varifocal system includes a head-mounted display (HMD). The HMD includes a varifocal block. The HMD presents content via an electronic display to a wearing user at a focal distance. The varifocal block adjusts the focal distance in accordance with instructions from the HMD to, e.g., mitigate vergence accommodation conflict of eyes of the wearing user. The focal distance is adjusted by adjusting an optical power associated with the varifocal block, and specifically by adjusting the optical powers associated with one or more varifocal structures within the varifocal block.

A varifocal structure is an optical device that is configured to dynamically adjust its focus in accordance with instructions from the varifocal system. The varifocal block include ones or more varifocal structures in optical series. In the disclosed embodiments, the varifocal structure includes a stacked first-type liquid crystal (LC) lens structure and a stacked second-type LC lens structure in optical series. The stacked first-type LC lens structure includes a plurality of first-type LC lenses, each of which utilizes the change in polar angle (or tilt angle) of LC molecules to create a lens profile and provide continuously variable focal states with a first step resolution. The stacked second-type LC lens structure includes a plurality of second-type LC lenses utilizing the change in azimuthal angle of LC molecules to create a lens profile. The stacked second-type LC lens structure provides a plurality of discrete focal states with a second step resolution. The first step resolution is smaller than the second step resolution, such that when the stacked second-type LC lens structure is switched between two optical states, the first-type LC lenses provide a continuous adjustment of optical power between the two optical states, and the stacked first-type LC lens structure and the stacked second-type LC lens structure together provide a continuous adjustment range of optical power for the varifocal structure.

Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

A PBP LC lens may be active or passive. An active PBP LC lens is an optical element that has three discrete focal states (also referred to as optical states). The three optical states are an additive state, a neutral state, and a subtractive state. The additive state adds optical power to the system (i.e., has a positive focus of 'f'), the neutral state does not affect the optical power of the system (and does not affect the polarization of light passing through the PBP LC lens), and the subtractive state subtracts optical power from the system (i.e., has a negative focus of '−f').

The state of an active PBP LC lens is determined by the by the handedness of polarization of light incident on the active PBP LC lens and an applied voltage. An active PBP LC lens operates in a subtractive state responsive to incident light with a left-handed circular polarization and an applied voltage of zero (or more generally below some minimal value), operates in an additive state responsive to incident light with a right-handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field. Note that when the active PBP LC lens is in the additive or subtractive state, light output from the active PBP LC lens has a handedness opposite to that of the light input into the active PBP LC lens. In contrast, when the active PBP LC lens is in the neutral state, light output from the active PBP LC lens has the same handedness as the light input into the active PBP LC lens.

In contrast, a passive PBP LC lens has two optical states, specifically, an additive state and a subtractive state. The state of a passive PBP LC lens is determined by the handedness of polarization of light incident on the passive PBP LC lens. A passive PBP LC lens operates in a subtractive state responsive to incident light with a left-handed polarization, and operates in an additive state responsive to incident light with a right-handed polarization. Note that the passive PBP LC lens outputs light that has a handedness opposite to that of the light input into the passive PBP LC lens.

The stacked first-type LC lens structure may include a first LC lens providing a variable optical power to linearly polarized light having a first polarization direction, and a second LC lens providing a variable optical power to linearly polarized light having a second polarization direction perpendicular to the first direction. The first LC lens and the second LC lens are optical elements which utilize the change in polar angle (or tilt angle) of LC molecules to create a lens profile, i.e., a refractive index profile.

To generate a desired refractive index profile, various electrode structures and addressing approaches have been introduced to the LC lens, such as a set of the discrete ring-patterned electrodes addressed individually with different voltages, the spatial distribution of electric field on a hole-patterned electrode plate to control the index profile, or a spherical shape of the electrode, which can be addressed to tune the optical power continuously. That is, the LC lens which utilizes the change in polar angle (or tilt angle) to create the lens profile can provide continuously variable focal states. In contrast, the PBP LC lens, which utilizes the change in azimuthal angle to create a lens profile, only provides a plurality of discrete focal states, for example, an active PBP LC lens provides 3 focal states, a passive PBP LC lens provides 2 focal states.

The polarization converter is an active polarization converter which converts the polarization direction of the incident linearly polarized light from a first polarization direction to a second polariton polarization direction perpendicular to the first polarization direction or maintains the polarization direction of linearly polarized light in accordance with a switching state (i.e., active or non-active). In certain embodiments, the polarization converter may be a switchable half waveplate (SHWP). The linear-to-circular polarization converter coverts linearly polarized light with orthogonal polarization directions to circularly polarized light having the same handedness in accordance with a switching state (i.e., active or non-active). In certain embodiments, the linear-to-circular polarization converter may include an active polarization converter and a quarter waveplate (QWP).

In certain embodiments, a virtual object is presented on the electronic display of the HMD that is part of the varifocal system. The light emitted by the HMD is configured to have a particular focal distance, such that the virtual scene appears to a user at a particular focal plane. As the content to be rendered moves closer/farther from the user, the HMD correspondingly instructs the varifocal block to adjust the focal distance to mitigate a possibility of a user experiencing a conflict with eye vergence and eye accommodation. Additionally, in certain embodiments, the HMD may track a user's eyes such that the varifocal system is able to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the HMD adjusts the distance of the varifocal block to keep the user's eye in a zone of comfort as vergence and accommodation change.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence depth of the new object.

FIG. 1A shows an example of how the human eye experiences vergence and accommodation in the real world. As shown in FIG. 1A, the user is looking at a real object 100 (i.e., the user's eyes are verged on the real object 100 and gaze lines from the user's eyes intersect at real object 100). As the real object 100 is moved closer to the user, as indicated by the arrow in FIG. 1A, each eye 102 rotates inward (i.e., convergence) to stay verged on the real object 100. As the real object 100 gets closer, the eye 102 must "accommodate" for the closer distance by changing its shape to reduce the power or focal length. Thus, under normal conditions in the real world, the vergence depth ($d_v$) is equal to the focal length ($d_f$).

Figure 1B:
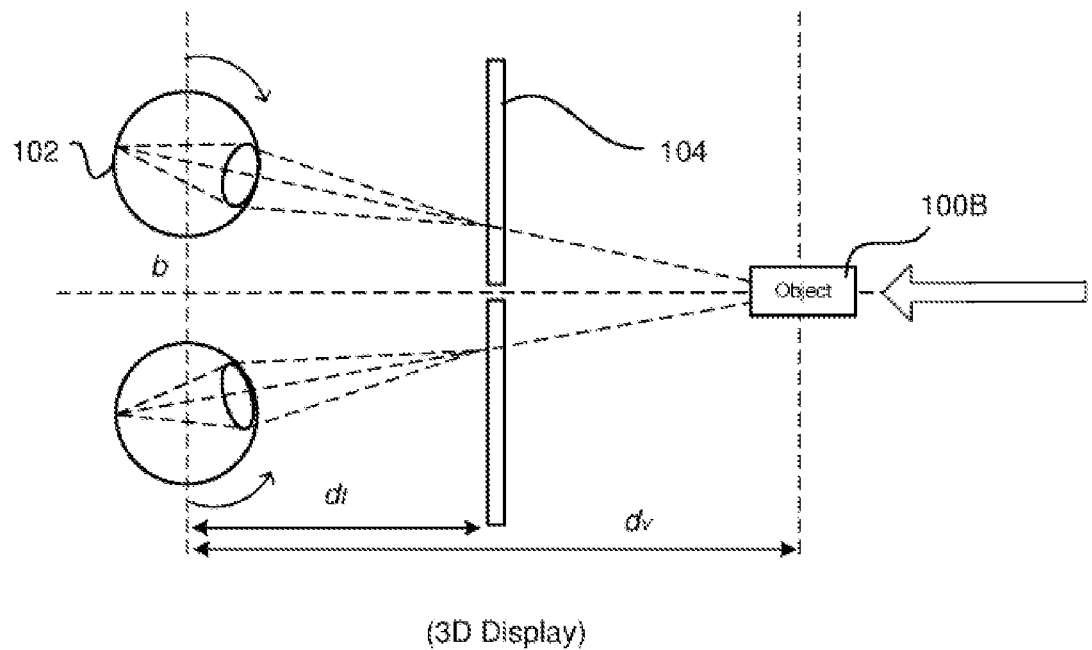
FIG. 1B shows the conflict between vergence and eye focal length in a three dimensional (3D) display screen of the present disclosure.

FIG. 1B shows an example conflict between vergence and accommodation that can occur with some three-dimensional displays. As shown in FIG. 1B, a user is looking at a virtual object 100B displayed on an electronic screen 104. However, the user's eyes are verged on and gaze lines from the user's eyes intersect at virtual object 100B, which is a greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, each eye 102 maintains accommodation at a distance associated with the electronic display 104. Thus, the vergence depth (dv) often is not equal to the focal length (df) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2A:
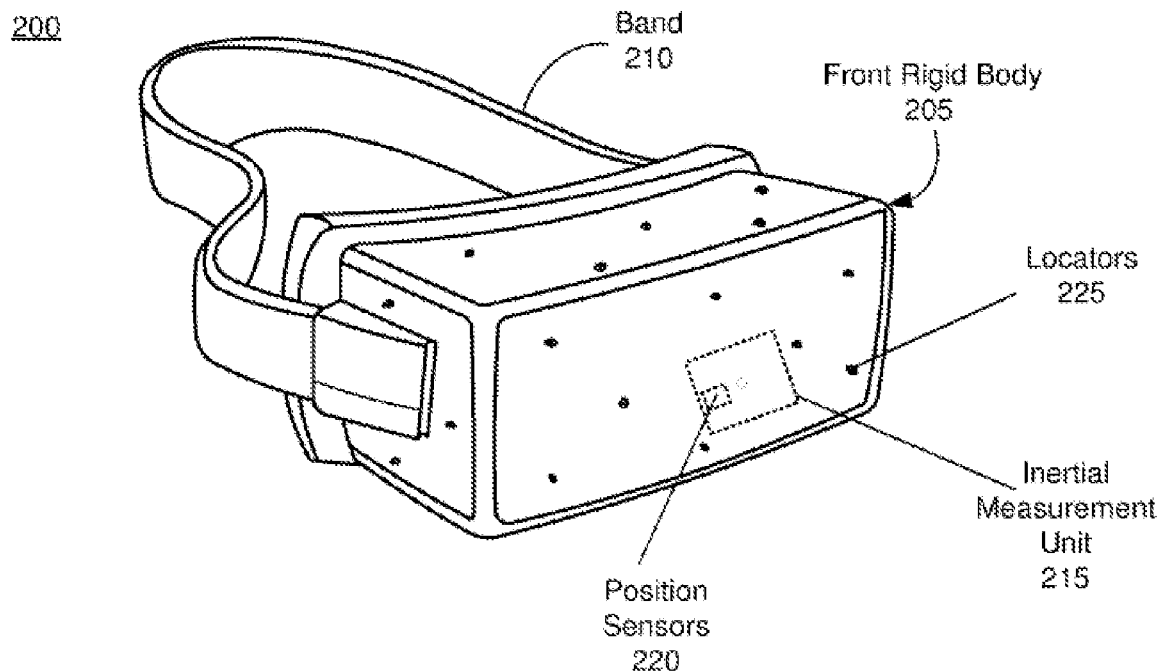
FIG. 2A is a wire diagram of a head-mounted display, in accordance with an embodiment of the present disclosure.

FIG. 2A is a wire diagram of a HMD 200, in accordance with an embodiment. As shown in FIG. 2A, the HMD 200 may include a front rigid body 205 and a band 210. The front rigid body 205 may include one or more electronic display elements of an electronic display (not shown), an inertial measurement unit (IMU) 215, one or more position sensors 220, and locators 225. In the embodiment shown by FIG. 2A, the position sensors 220 may be located within the IMU 215, and neither the IMU 215 nor the position sensors 220 may be visible to the user. The IMU 215, the position sensors 220, and the locators 225 may be discussed in detail below with regard to FIG. 7. Note in embodiments, where the HMD 200 acts as an AR or MR device portions of the HMD 200 and its internal components may be at least partially transparent.

Figure 2B:
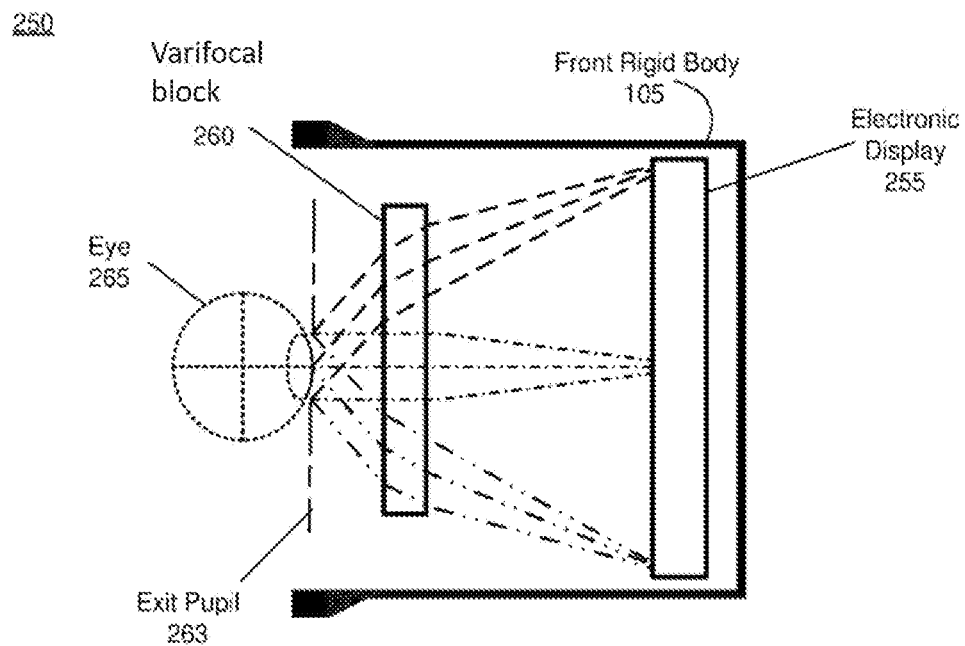
FIG. 2B is a cross section of a front rigid body of the head-mounted display in FIG. 2A, in accordance with an embodiment of the present disclosure.

FIG. 2B is a cross section 250 of the front rigid body 205 of the embodiment of the HMD 200 shown in FIG. 2A. As shown in FIG. 2B, the front rigid body 205 may include an electronic display 255 and a varifocal block 260 that together provide image light to an exit pupil 263. The exit pupil 263 may be the location of the front rigid body 205 where a user's eye 265 is positioned. For purposes of illustration, FIG. 2B shows a cross section 250 associated with a single eye 265, but another varifocal block 260, separate from the varifocal block 260, provides altered image light to another eye of the user. Additionally, the HMD 200 may include an eye tracking system (not shown). The eye tracking system may include, e.g., one or more sources that illuminate one or both eyes of the user, and one or more cameras that captures images of one or both eyes of the user.

The electronic display 255 may display images to the user. In various embodiments, the electronic display 255 may comprise a single electronic display or multiple electronic displays (e.g., a display for each eye of a user). Examples of the electronic display 255 include: a liquid crystal display (LCD), an organic light-emitting diode (OLED) display, an active-matrix organic light-emitting diode display (AMOLED), a quantum dot organic light-emitting diode (QOLED), a quantum dot light-emitting diode (QLED), some other display, or some combination thereof.

The varifocal block 260 may adjust an orientation from light emitted from the electronic display 255, such that it appears at particular focal distances from the user. The varifocal block 260 may include one or more varifocal structures in optical series. A varifocal structure is an optical device that is configured to dynamically adjust its focus in accordance with instructions from a varifocal system. In the disclosed embodiments, the varifocal structure may include a polarization converter converting incident linearly polarized light between a first polarization direction and a second polarization direction, a first liquid crystal lens in response to linearly polarized light having the first polarization direction, a second liquid crystal lens in response to linearly polarized light having the second polarization direction, a linear-to-circular polarization converter, and a stacked Pancharatnam Berry Phase (PBP) liquid crystal lens structure in optical series. The varifocal structure may also include one or more substrate layers, a linear polarizer, or some combination thereof. For example, the linear polarizer may be optically coupled to the polarization converter, to ensure the light incident onto the polarization converter is incident linearly polarized light having the first polarization direction or the second polarization direction.

The substrate layers are layers which other elements (e.g., SHWP, liquid crystal, etc.) may be formed upon, coupled to, etc. The substrate layers are substantially transparent in the visible band (~380 nm to 750 nm). In certain embodiments, the substrate may also be transparent in some or all of the infrared (IR) band (~750 nm to 1 mm). The substrate layers may be composed of, e.g., $SiO_2$, plastic, sapphire, etc.

Additionally, in certain embodiments, the varifocal block 260 may magnify received light, corrects optical errors associated with the image light, and presents the corrected image light is presented to a user of the HMD 200. The varifocal block 260 may additionally include one or more optical elements in optical series. An optical element may be an aperture, a Fresnel lens, a convex lens, a concave lens, a filter, or any other suitable optical element that affects the blurred image light. Moreover, the varifocal block 260 may include combinations of different optical elements. In certain embodiments, one or more of the optical elements in the varifocal block 260 may have one or more coatings, such as anti-reflective coatings.

Figure 3A:
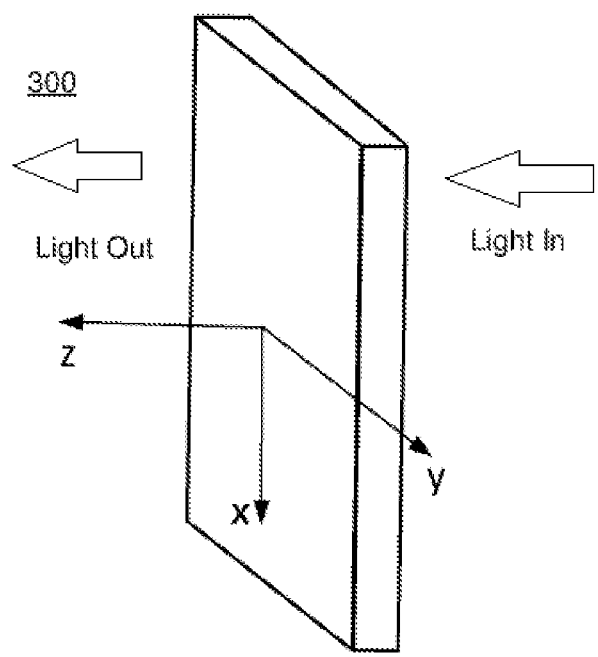
FIG. 3A is an example of Pancharatnam Berry Phase (PBP) liquid crystal (LC) lens, in accordance with an embodiment of the present disclosure.

FIG. 3A is an example of PBP LC lens 300, in accordance with an embodiment. As shown in FIG. 3A, the PBP LC lens 300 may create a respective lens profile via an in-plane orientation (θ, azimuth angle) of a liquid crystal molecule, in which the phase difference T=2θ. In contrast, a conventional liquid crystal lens creates a lens profile via a birefringence (Δn) and layer thickness (d) of liquid crystals, and a number (#) of Fresnel zones (if it is Fresnel lens design), in which the phase difference T=dΔn*#*2π/λ. Accordingly, in certain embodiments, the PBP LC lens 300 may have a large aperture size and may be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g. ~±2 Diopters or more), fast switching speeds (e.g., ~300 ms), and a good quality image. Note conventional liquid crystal lenses may be not well suited to these applications, because a conventional liquid crystal lens generally would require the liquid crystal materials to have a relatively high index of refraction or be relatively thick (which reduces switching speeds). In contrast, a PBP LC lens is able to meet design specs using liquid crystal materials having a relatively low index of refraction and, moreover, the PBP LC lens is thin (e.g., a single liquid crystal layer can be ~2 μm) and has high switching speeds (e.g., 300 ms).

Figure 3B:
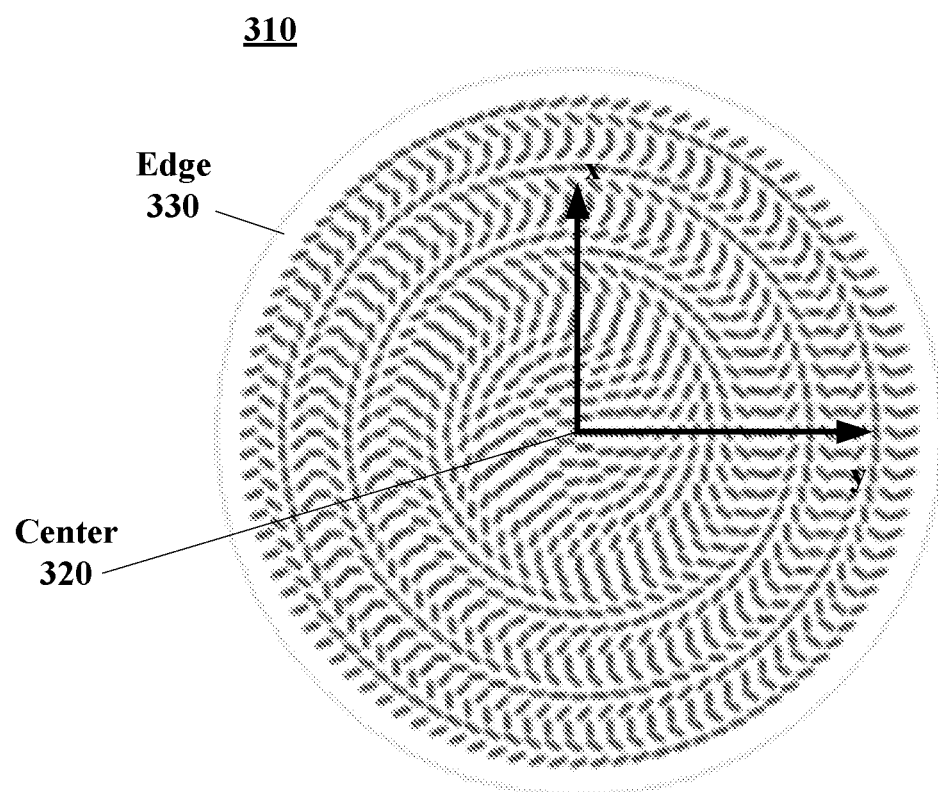
FIG. 3B is an example of liquid crystal orientations in the PBP LC lens in FIG. 3A, in accordance with an embodiment of the present disclosure.

FIG. 3B is an example of liquid crystal orientations 310 in the PBP LC lens 300 of FIG. 3A, in accordance with an embodiment. As shown in FIG. 3B, in the PBP LC lens 300, an azimuth angle (θ) of a liquid crystal molecule may be continuously changed from a center 320 of the liquid crystal lens 300 to an edge 330 of the PBP LC lens 300, with a varied pitch Λ. Pitch is defined in a way that the azimuth angle of LC is rotated 180° from the initial state.

Figure 3C:
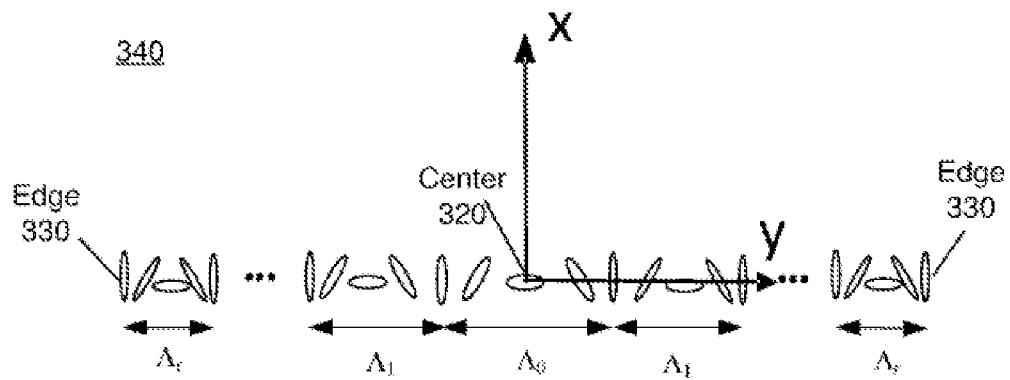
FIG. 3C is a portion of liquid crystal orientations in the PBP LC lens in FIG. 3A, in accordance with an embodiment of the present disclosure.

FIG. 3C is a section of liquid crystal orientations 340 taken along y-axis in the PBP LC lens 300 of FIG. 3A, in accordance with an embodiment. As shown in FIG. 3C, it is apparent from the liquid crystal orientation 340 that a rate of pitch variation may be a function of distance from the lens center 320. The rate of pitch variation may increase with distance from the lens center. For example, the pitch at the lens center 320 ($Λ_0$) is the slowest, and the pitch at the edge 330 ($Λ_r$) is the highest, i.e., $Λ_0 > Λ_1 > \ldots > Λ_r$. In the x-y plane, to make a PBP LC lens with lens radius (r) and lens power (+/−f), the azimuth angle θ may meet: $2θ=r^2/f*(π/λ)$, where λ, is the wavelength of light. Along with the z-axis, a dual twist or multiple twisted structure layers offers achromatic performance on efficiency in the PBP LC lens 300. Along with the z-axis, the non-twisted structure is simpler to fabricate then a twisted structure, but is optimized for a monochromatic light.

Note that a PBP LC lens may have a twisted or non-twisted structure. In certain embodiments, a stacked PBP LC lens structure may include one or more PBP LC lenses having a twisted structure, one or more PBP LC lenses having a non-twisted structure, or some combination thereof.

Although a PBP LC lens is able to meet design specs of HMDs, a PBP LC lens and a PBP LC lens stack may only provide a plurality of discrete focal states. As a result, when an individual PBP LC lens has a substantially large optical power or a PBP LC lens stack has a substantially large step resolution (e.g., 0.5 Diopters), obvious image distortion may be perceived by human eyes during the switching between the discrete focal states, which degrades the viewing experience. It is possible to fabricate a PBP LC lens having a substantially small optical power (e.g., 0.05 Diopters), then the image distortion happened during the switching between the discrete focal states may be too small to be perceived by human eyes. However, a large number of PBP LC lenses may have to be stacked together to obtain a desired range of optical power to adapt for human eye vergence-accommodation (e.g., ~±2 Diopters or more) in HMDs. Accordingly, the PBP LC lens stack may be substantially thick.

As discussed above, an LC lens which utilizes the change in polar angle (or tilt angle) to create the lens profile can provide visually continuously variable focal states, because the step resolution of the LC lens is too small to be perceived by human eyes, for example, the step resolution of the LC lens may be smaller than 1/10 of the step resolution of a stacked PBP LC lens structure. In view of this, the present disclosure provides a varifocal structure based on hybrid tunable liquid crystal lenses, which include first and second liquid crystal lenses utilizing the change in polar angle (or tilt angle) of LC molecules to create a lens profile, and a stacked PBP LC lens structure in optical series.

The stacked PBP LC lens structure may provide a plurality of discrete focal states, and the first and second liquid crystal lenses may alternately provide continuously variable focal states when switching among the discrete focal states of the stacked PBP LC lens structure. The stacked PBP LC lens structure, the first LC lens, and the second LC lens together may provide continuously variable focal states (i.e., a continuous range of adjustment of optical power) for the varifocal structure. Thus, when switching among the discrete focusing states of the stacked PBP LC lens structure, the image distortion caused by large step resolution of the PBP LC lens stack may be suppressed, and smoother transition between different focal states may be perceived by the human eyes.

Below various designs of varifocal structures are discussed. It is important to note that these designs are merely illustrative, and other designs of varifocal structures may be generated using the principles described herein. In certain embodiments, the varifocal structures within the varifocal block 260 may be designed to meet requirements for an HMD (e.g., the HMD 200). Design requirements may include, for example, large aperture size (e.g., 2:4 cm) for large field of view (e.g., FOV, ~90 degrees with 20 mm eye relief distance), large optical power (e.g., ±2.0 Diopters) for adapting human eye vergence accommodation, and fast switching speed (~300 ms) for adapting human eye vergence-accommodation, and good image quality for meeting human eye acuity. In certain other embodiments, the varifocal structures may include other optical elements in optical series.

Figure 4A:
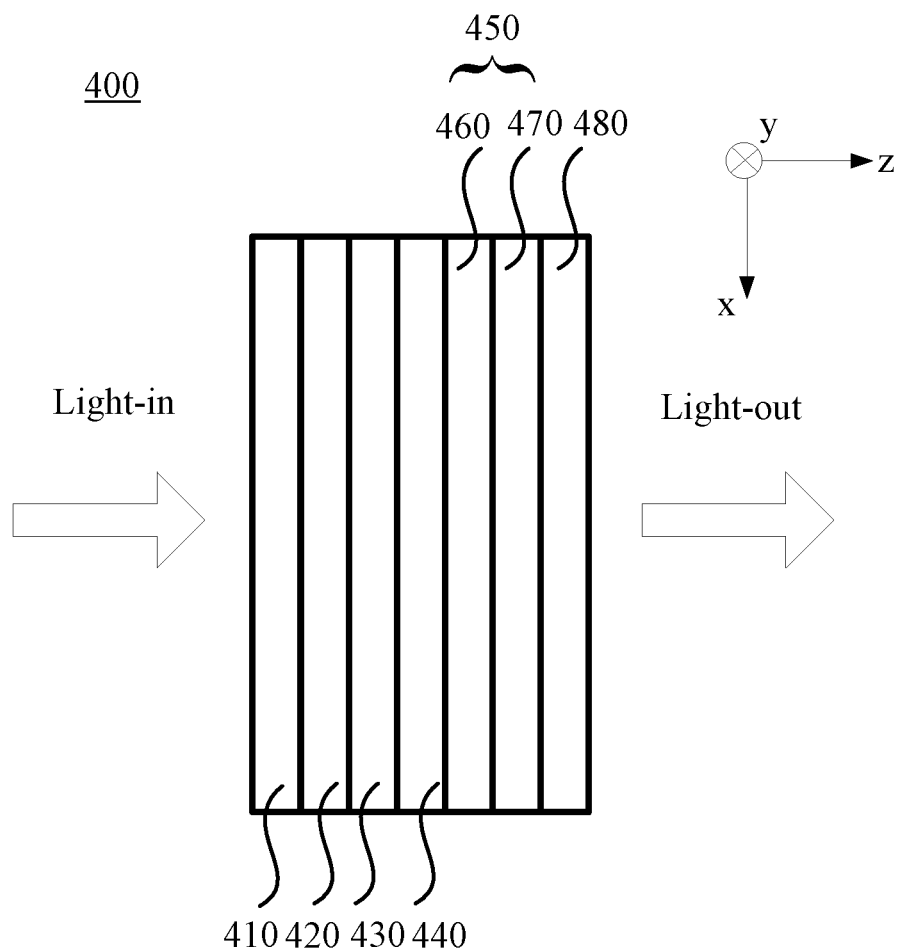
FIG. 4A is a diagram of a varifocal structure using hybrid tunable LC lenses, in accordance with an embodiment of the present disclosure.

FIG. 4A is a diagram of a varifocal structure including hybrid tunable liquid crystal lenses, in accordance with an embodiment. As shown in FIG. 4A, the varifocal structure may include a linear polarizer 410, a polarization converter 420, a first liquid crystal (LC) lens 430, a second LC lens 440, a linear-to-circular polarization converter 450, and a stacked Pancharatnam Berry Phase (PBP) LC lens structure 480 in optical series.

In particular, the linear polarizer 410 may transmit linearly polarized light with a particular polarization direction, for example, a first polarization direction. In certain embodiments, the linear polarizer 410 may be omitted when the light-in is linearly polarized light having the first polarization direction. The polarization converter 420 may be an active polarization converter which converts or maintains the polarization direction of linearly polarized light in accordance with a switching state (i.e., active or non-active). The switching state of the polarization converter 420 is either active or non-active. For example, when active, the polarization converter 420 may convert the polarization direction of linearly polarized light from the first polarization direction to a second polarization direction perpendicular to the first polarization direction. When non-active, the polarization converter 420 may directly transmit the linearly polarized light having the first polarization direction without affecting the polarization direction. In certain embodiments, the polarization converter 420 may be a switchable half waveplate (SHWP).

The first LC lens 430 and the second LC lens 440 each may be an LC lens which utilizes the change in polar angle (or tilt angle) to create the lens profile, and provide continuously variable focal states. In certain embodiments, the first LC lens 430 and the second LC lens 440 may have the same structure but arranged in a specific manner, such that one of the first LC lens 430 and the second LC lens 440 may be configured to provide an adjustable range of optical power (i.e., continuously variable focal states) for linearly polarized light having the first polarization direction, and the other may be configured to provide an adjustable range of optical power (i.e., continuously variable focal states) for linearly polarized light having the second polarization direction.

Figure 4B:
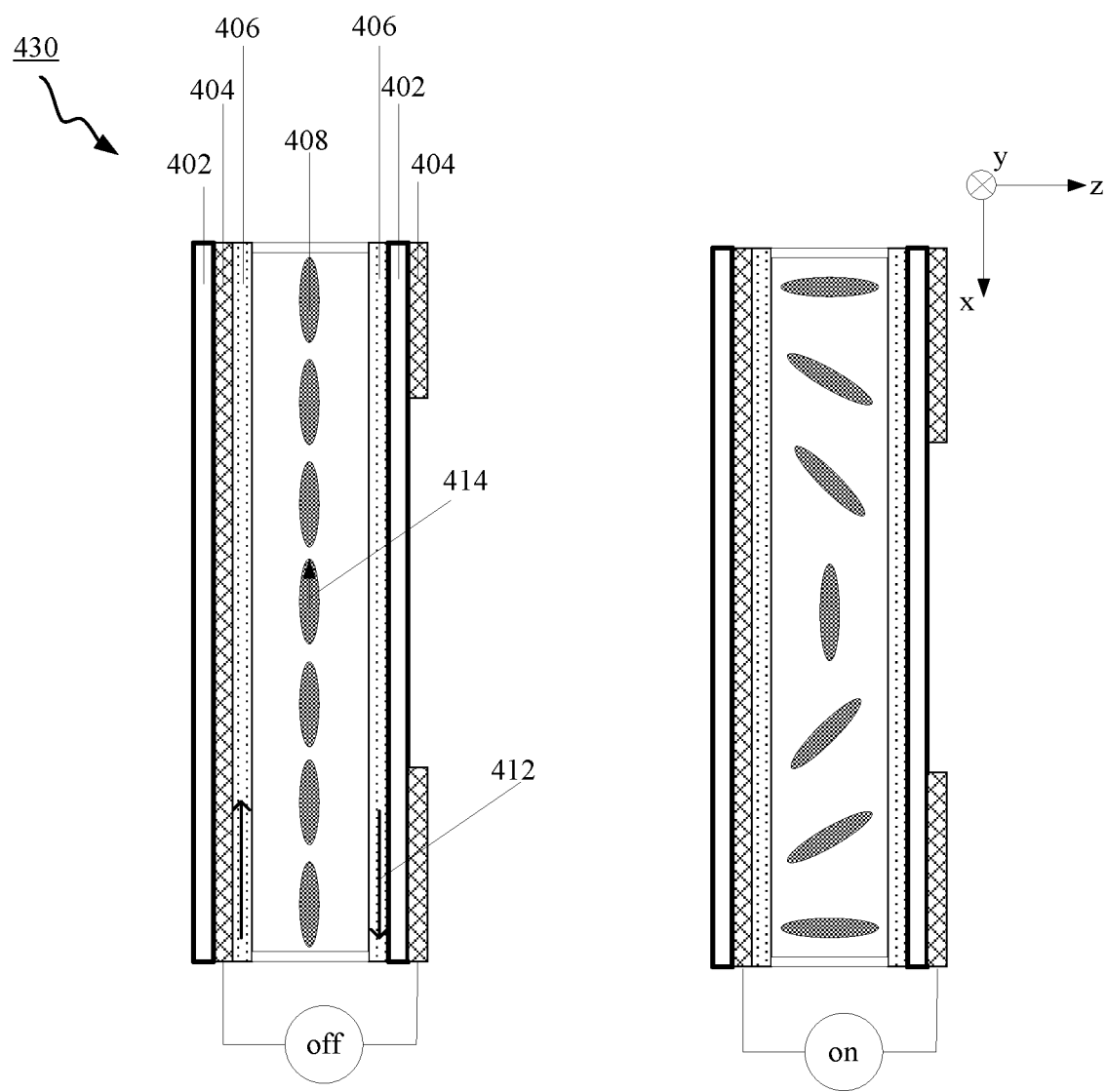
FIG. 4B is an example of a first LC lens in FIG. 4A, in accordance with an embodiment of the present disclosure.

FIG. 4B is an example of a first LC lens 430 in FIG. 4A, in accordance with an embodiment. As shown in FIG. 4B, the first LC lens 430 may include an LC cell formed by two substrates 402 (e.g., glass substrates). Transparent indium tin oxide (ITO) electrodes 404 may be disposed on opposing surfaces of the substrates 402 to apply an electric field. The ITO electrodes 404 may include a planar electrode and a ring-shaped electrode, respectively. A polyimide alignment layer 406 may be coated on each substrate 402 and rubbed along one direction to enable a preferred orientation of LC molecules 408 in the LC cell.

After a voltage is applied to the LC cell, due to the ring-shaped ITO electrode disposed on the substrate 402, from the center to the edge of the LC cell, the electrical field may gradually increase and, thus, the orientation of LC directors 414 may change from being parallel to the surface of the substrate 402 to being closer to perpendicular to the surface of the substrate 402. Accordingly, for the incident light having an x-direction polarization direction, the effective refractive index of the LC molecules 408 may gradually change from the center to the edge of the LC cell. Thus, a positive lens profile may be obtained, i.e., the formed LC lens may be a positive LC lens having positive optical power. Because the lens profile can be continuously adjusted along with the continuously varied voltage applied to the LC cell, the formed LC lens may be able to provide a continuous range of adjustment of the optical power, i.e., continuously variable focal states.

It should be noted that, FIG. 4B shows an LC lens structure based on light refraction, which is merely for illustrative purposes and is not intended to limit the scope of the present disclosure. The first LC lens 430 and the second LC lens 440 may have any appropriate structure which utilize the change in polar angle (or tilt angle) to create the lens profile and provide continuously variable focal states, such as a Fresnel LC lens based on light diffraction. In certain embodiments, the first LC lens 430 and/or the second LC lens 440 may be a negative lens providing continuous variable negative optical power. In certain embodiments, the first LC lens 430 and/or the second LC lens 440 may provide continuous variable negative optical power and positive optical power. In certain embodiments, the first LC lens 430 and the second LC lens 440 may also have different lens structures.

To enable one of the first LC lens 430 and the second LC lens 440 to provide continuously variable focal states for linearly polarized light having the first polarization direction and the other to provide continuously variable focal states for linearly polarized light having the second polarization direction perpendicular to the first polarization direction, in certain embodiments, the alignment direction (i.e., the rubbing direction) of the first LC lens 430 may be perpendicular to the alignment direction of the second LC lens 440. A corresponding structure is shown in FIGS. 4C-4E.

Figure 4C:
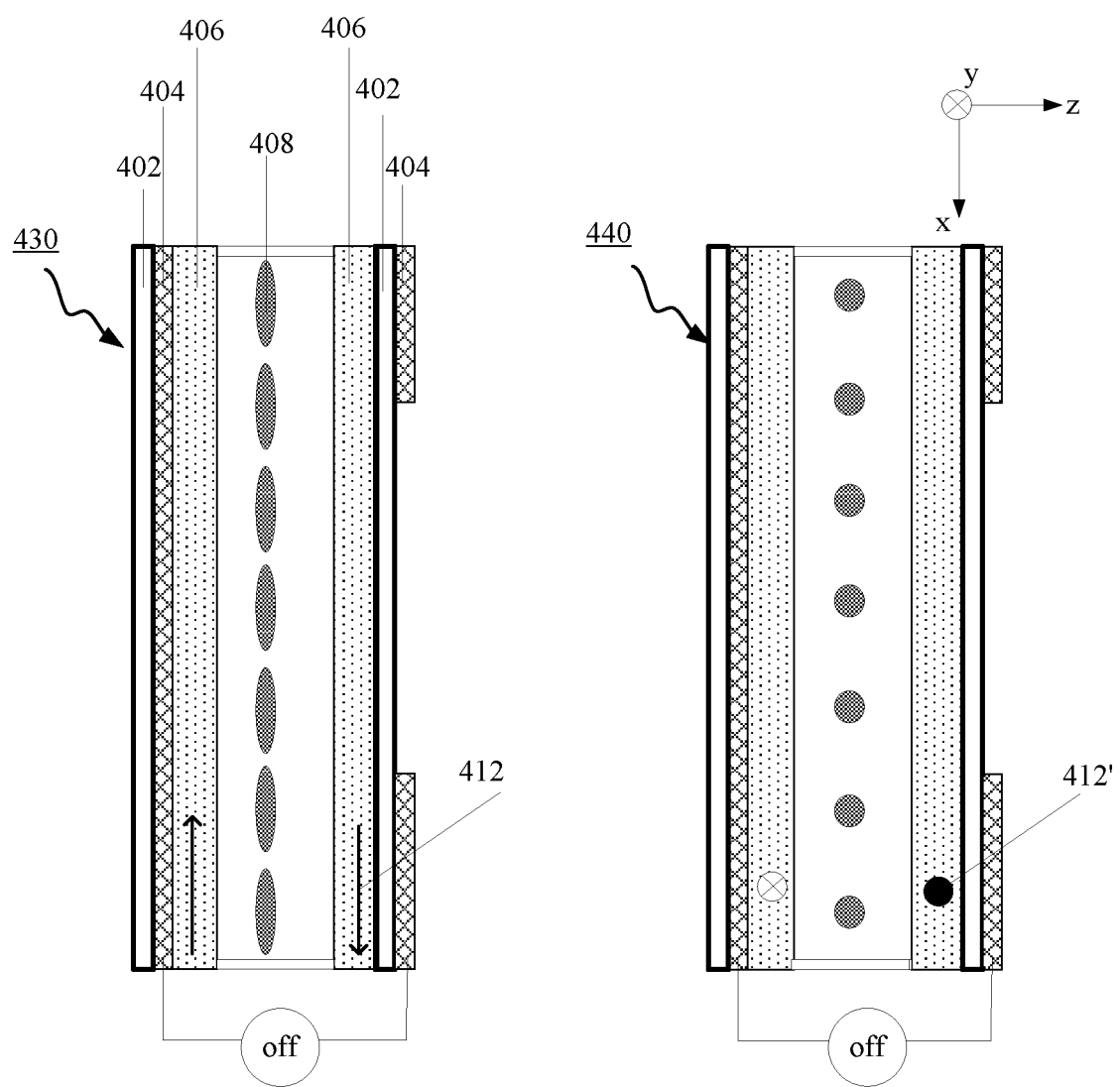
FIG. 4C is an example of the switched-off first LC lens and the switched-off second LC lens in FIG. 4A, in accordance with an embodiment of the present disclosure.
Figure 4D:
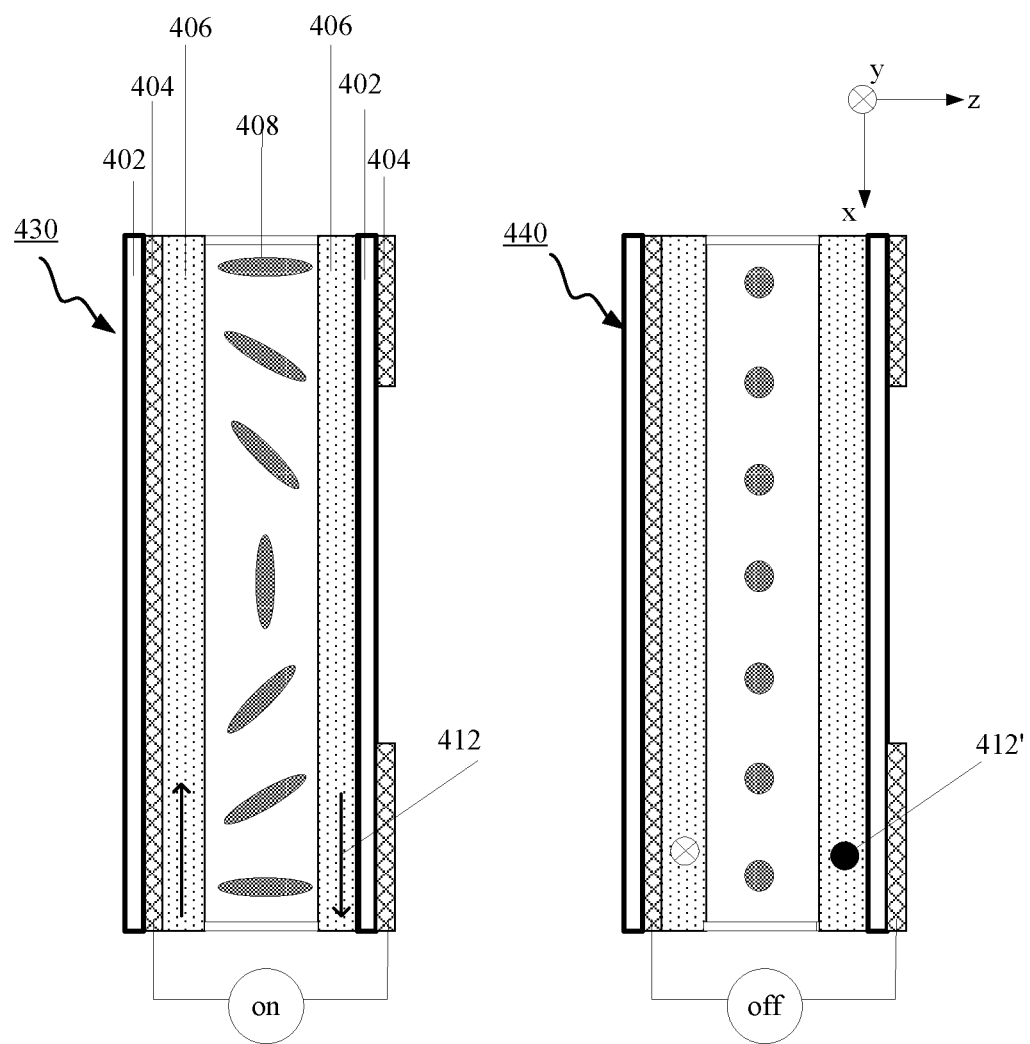
FIG. 4D is an example of the switched-on first LC lens and the switched-off second LC lens in FIG. 4A, in accordance with an embodiment of the present disclosure.
Figure 4E:
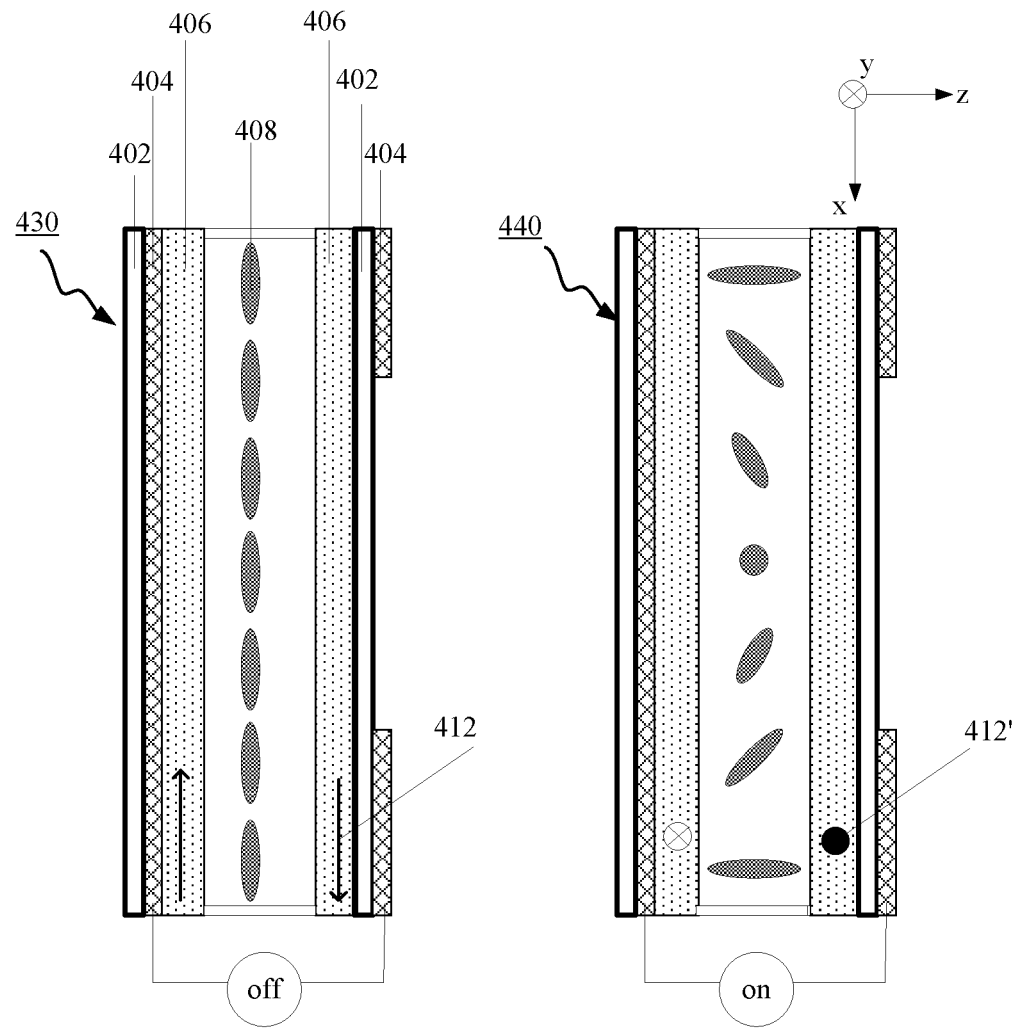
FIG. 4E is an example of the switched-off first LC lens and the switched-on second LC lens in FIG. 4A, in accordance with an embodiment of the present disclosure.

FIG. 4C is an example of the switched-off first LC lens and the switched-off second LC lens in FIG. 4A, in accordance with an embodiment, FIG. 4D is an example of the switched-on first LC lens and the switched-off second LC lens in FIG. 4A, in accordance with an embodiment, and FIG. 4E is an example of the switched-off first LC lens and the switched-on second LC lens in FIG. 4A, in accordance with an embodiment.

As shown in FIGS. 4C-4E, both the first LC lens 430 and second LC lens 440 may have a homogeneous alignment, the alignment directions (i.e., the rubbing directions) 412 of the first LC lens 430 may be along ±x direction, the alignment direction 412' of the second LC lens 440 may be along ±y direction. The light propagation direction may be along +z direction.

Thus, in one embodiment, provided the first polarization direction is along the x-direction and the second polarization direction is along the y-direction, i.e., the linear polarized light having the first polarization direction is p-polarized light and the linear polarized light having the second polarization direction is s-polarized light, the first LC lens 430 may provide the continuously variable focal states for the linearly polarized light having the first polarization direction (x-direction) as the applied voltage continuously varies, while appear to be a transparent plate to the linearly polarized light having the second polarization direction (y-direction), as FIG. 4D shows. Meanwhile, the second LC lens 440 may provide continuously variable focal states for linearly polarized light having the second polarization direction (y-direction) as the applied voltage continuously varies, while appear to be a transparent plate to the linearly polarized light having the first polarization direction (x-direction), as FIG. 4E shows.

It should be noted that, FIGS. 4C-4E shows the first the first LC lens 430 and the second LC lens 440 are separated from each other by a certain distance, which is for illustrative purposes and is not intended to limit the scope of the present disclosure. The first LC lens 430 and the second LC lens 440 may be arrange without any gap, and/or may share certain substrates with each other.

Returning to FIG. 4A, the linear-to-circular polarization converter 450 may covert linearly polarized light to circularly polarized light. In certain embodiments, the linear-to-circular polarization converter may include an polarization converter 460 and a quarter waveplate (QWP) 470. Similar to the polarization converter 420, the polarization converter 460 may be an active polarization converter, e.g., a switchable half waveplate (SHWP), which converts or maintains the polarization direction of linearly polarized light in accordance with a switching state (i.e., active or non-active). The quarter waveplate 470 may convert the linearly polarized light to circularly polarized light.

In one embodiment, when active, the polarization converter 460 may convert the linearly polarized light having the first polarization direction to the second polarization direction. When non-active, the polarization converter 460 may directly transmit the linearly polarized light having the first polarization direction without affecting the polarization direction. That is, regardless being active or non-active, the polarization converter 460 may always output the linearly polarized light having the first polarization direction. After passing the quarter waveplate 470, the linearly polarized light having the first polarization direction may be converted to circularly polarized light.

In another embodiment, when active, the polarization converter 460 may convert the linearly polarized light having the second polarization direction to the first polarization direction. When non-active, the polarization converter 460 may directly transmit the linearly polarized light having the second polarization direction without affecting the polarization direction. That is, regardless being active or non-active, the polarization converter 460 may always output the linearly polarized light having the second polarization direction. After passing the quarter waveplate 470, the linearly polarized light having the second polarization direction may be converted to circularly polarized light.

That is, no matter whether the linear-to-circular polarization converter 450 receives the linearly polarized light having the first polarization direction or the second polarization direction, the linear-to-circular polarization converter 450 may always output circularly polarized light with a same handedness. The stacked PBP LC lens structure may include a plurality of PBP LC lens and at least one switchable half waveplate (SHWP) arranged adjacent to a PBP LC lens.

Figure 4F:
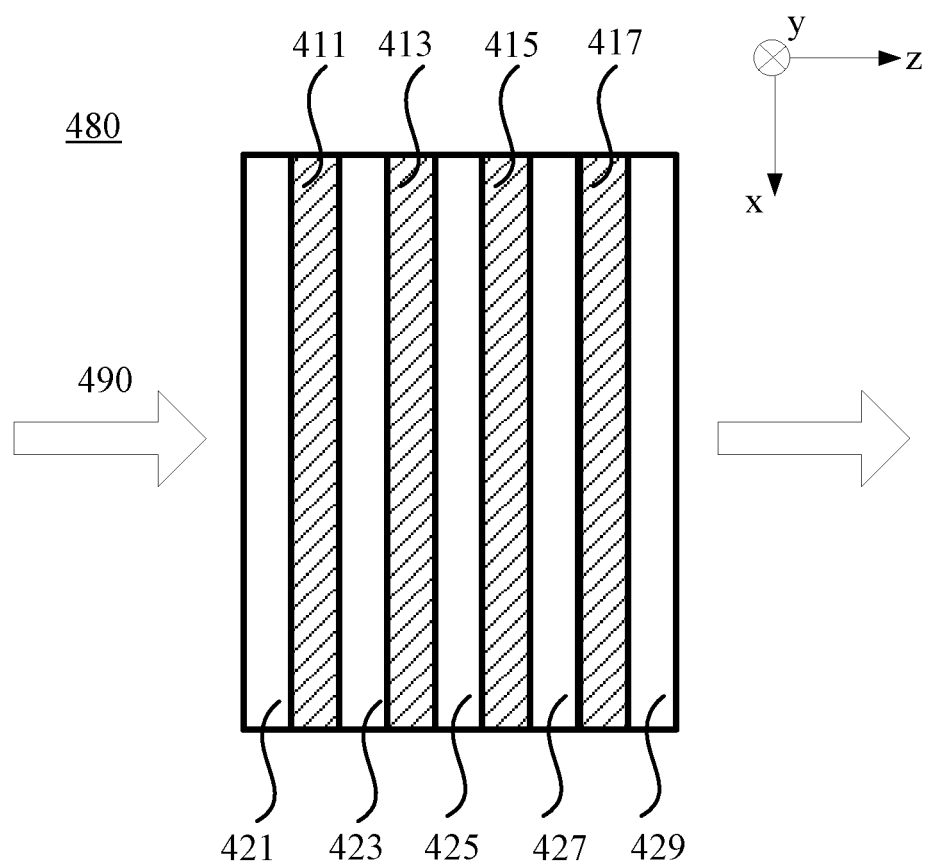
FIG. 4F is an example of a stacked PBP LC lens structure in FIG. 4A, in accordance with an embodiment of the present disclosure.

FIG. 4F is an example of a stacked PBP LC lens structure 480 in FIG. 4A, in accordance with an embodiment. The stacked PBP LC lens structure 480 may be composed of alternating SHWPs and active elements. As shown in FIG. 4F, the stacked PBP LC lens structure 480 may include active elements 421, 423, 425, 427, 429 and SHWPs 411, 413, 415, 417 alternately arranged.

An active element is an active PBP LC lens. In an additive state, the active element may add N*R of optical power, and in a subtractive state, the active element may subtract –N*R of optical power, where R (step resolution) is any positive number (e.g., 0.1, 0.25, 0.5 etc., the unit of R is diopter) and N is a positive integer. The active elements 421, 423, 425, 427, 429 included in the stacked PBP LC lens structure 480 may provide same or different optical power. In certain embodiments, the active elements 421, 423, 425, 427, 429 each may provide optical power of R in the additive state and –R in the subtractive state and, thus, the stacked PBP LC lens structure 480 may provide a range of optical power adjustment of –5R to 5R, in increments of R.

The SHWP 411, 413, 415, 417 may be a half waveplate that transmits a particular handedness of polarized light in accordance with a switching state (i.e., active or non-active). A varifocal block may use the SHWP to control the handedness of polarization of light in accordance with a switching state. The switching state of the SHWP is either active or non-active. When active, the SHWP may reverse the handedness of polarized light, and when non-active, the SHWP may transmit polarized light without affecting the handedness. As discussed above, a PBP LC lens acts in an additive state when receiving right-handed circularly polarized (RCP) light, and conversely, acts in a subtractive state if when receiving left-handed circularly polarized (LCP) light. Accordingly, a SHWP placed before a PBP LC lens in optical series may be able to control whether the PBP LC lens acts in an additive or subtractive state by controlling the handedness of polarization of the light incident onto the PBP LC lens.

As shown in FIG. 4F, the light-in 490 may be left-handed circularly polarized (LCP) light or right-handed circularly polarized (RCP) light. The state of the SHWP 411, 413, 415, 417 may determine the handedness of the light output from the SHWP 411, 413, 415, 417. When not in a neutral state, an active element reverses the handedness of circularly polarized light in addition to focusing/defocusing the incident light. Hence, when the light-in 490 is left-handed circularly polarized (LCP) light, the active element 421 may output right-handed circularly polarized (RCP) light with a reduction of optical power of –R. When the light incident onto the SHWP 411 is right-handed circularly polarized (RCP) light and the SHWP 411 is active, the SHWP 411 may reverse the polarization to left handedness, and when the light-in 490 is right-handed circularly polarized (RCP) light and the SHWP 411 is non-active, the SHWP 411 may maintain the polarization as right handed.

It should be noted that, the design of the stacked PBP LC lens structure 480 are merely for illustrative purposes, and other designs of stacked PBP LC lens structures may be generated using the principles described herein.

Returning to FIG. 4A, the first LC lens 430 and second LC lens 440 each may be configured to have a continuous adjustment range of optical power equal to or larger than the step resolution (i.e., R) of the stacked PBP LC lens structure 480. Herein the continuous adjustment range of optical power of the LC lens refers to a range from the minimum optical power to the maximum optical power of the LC lens.

During the operation of the varifocal structure, the stacked PBP LC lens structure 480 may provide a plurality of discrete focal states, and the first LC lens 430 and second LC lens 440 may alternately provide continuously variable focal states between two adjacent focal states of the stacked PBP LC lens structure 480. The stacked PBP LC lens structure 480, the first LC lens 430, and the second LC lens 440 together may provide continuously variable focal states (i.e., a continuous adjustment range of optical power) for the varifocal structure 400. Thus, when switching among the plurality of discrete focusing states of the stacked PBP LC lens structure 480, the image distortion caused by large step resolution (i.e., R) of the stacked PBP LC lens structure 480 may be suppressed, and smoother transition may be perceived by the human eyes. The continuous adjustment range of optical power of the varifocal structure 400 may be determined by the optical power of the stacked PBP LC lens structure 480, for example, a range from the maximum optical power to the minimum optical power of the stacked PBP LC lens structure. Details of the operation of the varifocal structure are discussed below with regard to FIGS. 5A-6C.

Figure 5A:
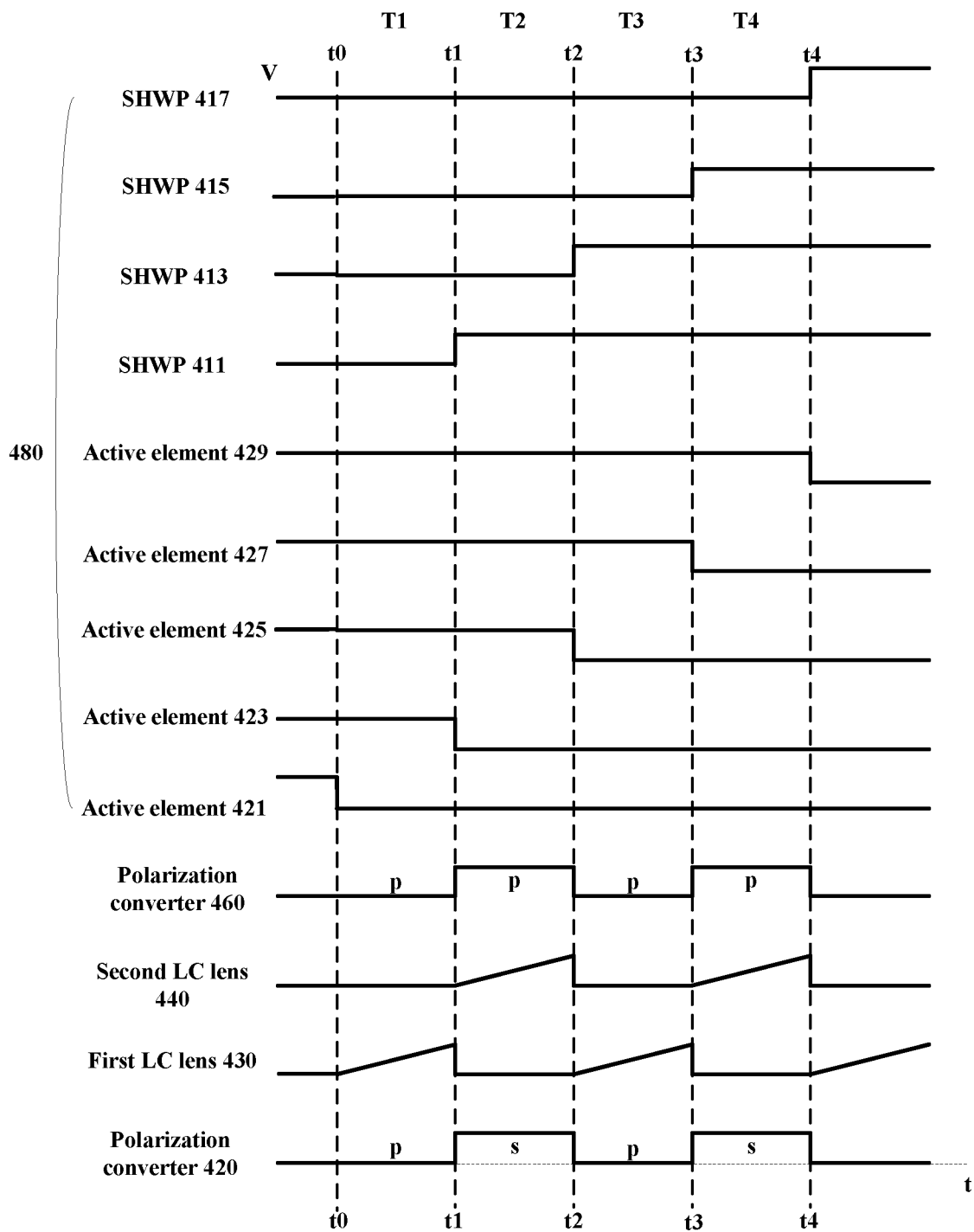
FIG. 5A is an example of a driving scheme of the varifocal structure in FIG. 4A, in accordance with an embodiment of the present disclosure.
Figures 5B, 5C:
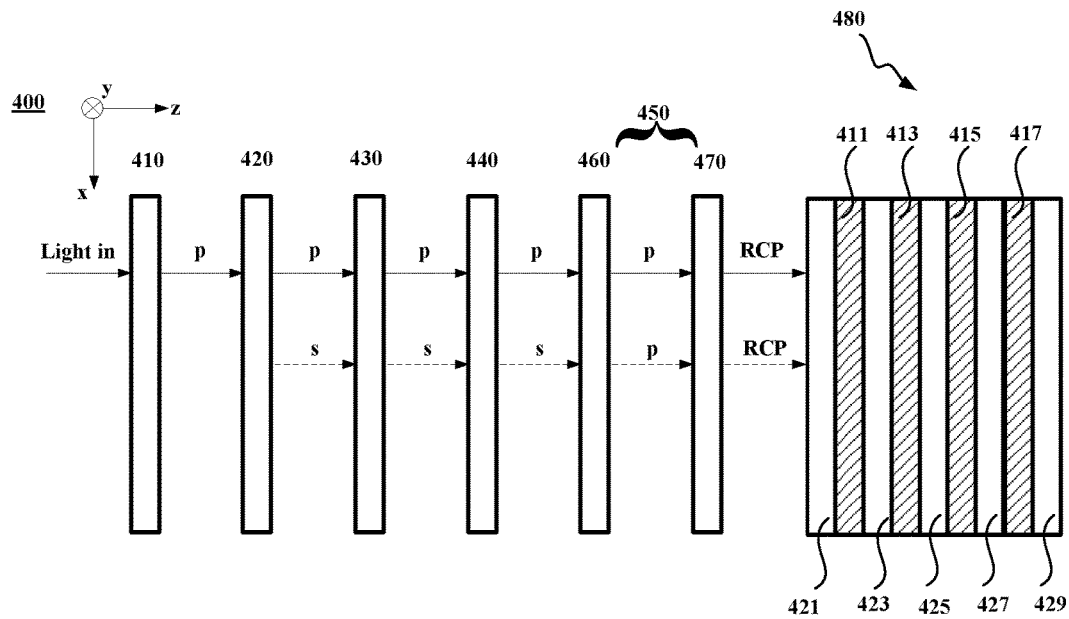
FIG. 5B is an example of an optical path of the varifocal structure having the driving scheme in FIG. 5A, in accordance with an embodiment of the present disclosure.
FIG. 5C is a table showing example optical adjustments in a positive range of the varifocal structure having the driving scheme in FIG. 5A, in accordance with an embodiment of the present disclosure.

FIG. 5A is an example of a driving scheme of the varifocal structure in FIG. 4A, in accordance with an embodiment, FIG. 5B is an example of an optical path of the varifocal structure having the driving scheme in FIG. 5A, in accordance with an embodiment, and FIG. 5C is a table showing example optical adjustments in a positive range of the varifocal structure having the driving scheme in FIG. 5A, in accordance with an embodiment. The horizontal axis and the vertical axis in FIG. 5A represent time and applied voltage to an element in the varifocal structure, respectively.

Referring to FIG. 5B, in certain embodiments, the light having the first polarization direction is p-polarized light and the light having the second polarization direction is s-polarized light. The polarization converter 420 may convert p-polarized light to s-polarized light in active, and maintain p-polarized light in non-active. The polarization converter 460 may convert s-polarized light to p-polarized light in active, and in non-active to maintain p-polarized light in non-active. In certain embodiments, the varifocal structure 400 may have an initial optical power A, where A may be any appropriate number with a unit of Diopter. For example, in the stacked PBP LC lens structure 480 of the varifocal structure 400 in FIG. 5B, the active element 421 is configured to have optical power of A in the additive state and −A in the subtractive state, and the initial optical power of A of the varifocal structure 400 is resulted from the active element 421. The active elements 423, 425, 427, 429 each provides optical power of R in the additive state and −R in the subtractive state, and the step resolution of the stacked PBP LC lens structure 480 is R.

When the active elements 421, 423, 425, 427, 429 operate in a neutral state (regardless of polarization) responsive to an applied voltage larger than a threshold voltage which aligns LC molecules with positive dielectric anisotropy along with the electric field, the optical power, the active elements 421, 423, 425, 427, 429 provide zero optical power. The first LC lens 430 and the second LC lens 440 each may have a continuous adjustment range of optical power equal to or larger than R.

Referring to FIGS. 5A-5C, during T1 stage (t0≤t<t1), the polarization converter 420 may be non-active and output p-polarized light. The first LC lens 430 may be switched-on to provide continuous variable optical power from 0 to R as the applied voltage gradually increases, and the second LC lens 440 may be switched off. The polarization converter 460 included in the linear-to-circularly polarization converter 450 may be non-active and output p-polarized light, and the p-polarized light may be converted to right-handed circularly polarized (RCP) light after passing the quarter waveplate 470 included in the linear-to-circularly polarization converter 450. The active element (AE) 421 may receive the right-handed circularly polarized (RCP) light, thereby having the additive state to provide optical power of A.

The active elements (AE) 423, 425, 427 and 429 may be in the neutral state (i.e., zero optical power) and the SHWPs 411, 413, 415 and 417 may be non-active without changing the handedness of the light incident thereon. Thus, from 0 to t1, the total optical power of the varifocal structure 400 may be continuously adjusted from A to A+R as the voltage applied to the first LC lens 430 gradually increases.

At the time point t1, the first LC lens 430 may be switched off. The SHWP 411 may become active, thereby changing the handedness of the circularly light from left handedness to right handedness, and the active element (AE) 423 may enter the additive state to provide optical power of R. The active element (AE) 421 may be in the additive state to provide optical power of A. Thus, at the time point t1, the varifocal structure 400 may have stable optical power of A+R.

During T2 stage (t1<t<t2), the polarization converter 420 may be active and output s-polarized light, the second LC lens 440 may be switched-on to provide continuous variable optical power from 0 to R as the applied voltage gradually increases, and the first LC lens 430 may be switched off. That is, the first LC lens 430 and the second LC lens 440 may be switched on and off alternatingly, and the first LC lens 430 and the second LC lens 440 may be considered as two independent channels to increase/decrease the optical power. Certainly, a different number of independent channels may also be used.

The polarization converter 460 may be active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWP 411 may be active to change the handedness of the circularly light from left handedness to right handedness, and the active elements (AE) 423 may be in the additive state to provide optical power of R. The active elements (AE) 425, 427 and 429 may be in the neutral state (i.e., zero optical power), and the SHWPs 413, 415 and 417 may be non-active without changing the handedness of the light incident thereon. Thus, from t1 to t2, the total optical power of the varifocal structure 400 may be continuously adjusted from A+R to A+2R as the voltage applied to the second LC lens 440 gradually increases.

At the time point t2, the second LC lens 440 may be switched off. The SHWP 413 may become active, thereby changing the handedness of the circularly light from left handedness to right handedness, and the active elements (AE) 425 may enter the additive state to provide optical power of R. The active elements (AE) 421 and 423 may be in the additive state to provide optical power of A and R, respectively. Thus, at the time point t2, the varifocal structure 400 may have stable optical power of A+2R.

During T3 stage (t2<t<t3), the polarization converter 420 may be non-active and output p-polarized light, the first LC lens 430 may be switched-on to provide continuous variable optical power from 0 to R as the applied voltage gradually increases, the second LC lens 440 may be switched off. The polarization converter 460 may be non-active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWPs 411 and 413 may be active to change the handedness of the circularly light from left handedness to right handedness, and the active elements (AE) 423 and 425 each may be in the additive state to provide optical power of R. The active elements (AE) 427 and 429 may be in the neutral state (i.e., zero optical power), and the SHWPs 415 and 417 may be non-active without changing the handedness of the light incident thereon. Thus, from t2 to t3, the total optical power of the varifocal structure 400 may be continuously adjusted from A+2R to A+3R as the voltage applied to the first LC lens 430 gradually increases.

At the time point t3, the first LC lens 430 may be switched off, the SHWP 415 may be active, thereby changing the handedness of the circularly light from left handedness to right handedness, and the active elements (AE) 427 may enter the additive state to provide an optical power of R. The active elements (AE) 421, 423, 425 may be in the additive state to provide optical power of A, R and R, respectively. Thus, at the time point t3, the varifocal structure 400 may have stable optical power of A+3R.

During T4 stage (t3<t<t4), the polarization converter 420 may be active and output s-polarized light, the second LC lens 440 may be switched-on to provide continuous variable optical power from 0 to R as the applied voltage gradually increases, and the first LC lens 430 may be switched off. The polarization converter 460 may be active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWPs 411, 413 and 415 may be active to change the handedness of the circularly light from left handedness to right handedness, and the active elements (AE) 423, 425, 427 each may be in the additive state to provide optical power of R. The active element (AE) 429 may be in the neutral state (i.e., zero optical power), and the SHWP 417 may be in the non-active without changing the handedness of the light incident thereon. Thus, from t3 to t4, the total optical power of the varifocal structure 400 may be continuously adjusted from A+3R to A+4R as the voltage applied to the second LC lens 440 gradually increases.

At the time point t4, the second LC lens 440 may be switched off, the SHWP 417 may be active, thereby changing the handedness of the circularly light from left handedness to right handedness, and the active elements (AE) 429 may enter the additive state to provide an optical power of R. The active elements (AE) 421, 423, 425 and 427 may be in the additive state to provide optical power of A, R, R and R, respectively. Thus, at the time point t4, the varifocal structure 400 may have stable optical power of A+4R.

Thus, from t0 to t4, the first LC lens 430, the second LC lens 440, and the stacked PBP LC lens structure 480 together may provide a continuous adjustment of optical power from A to A+4R for the varifocal structure 400.

Figure 6A:
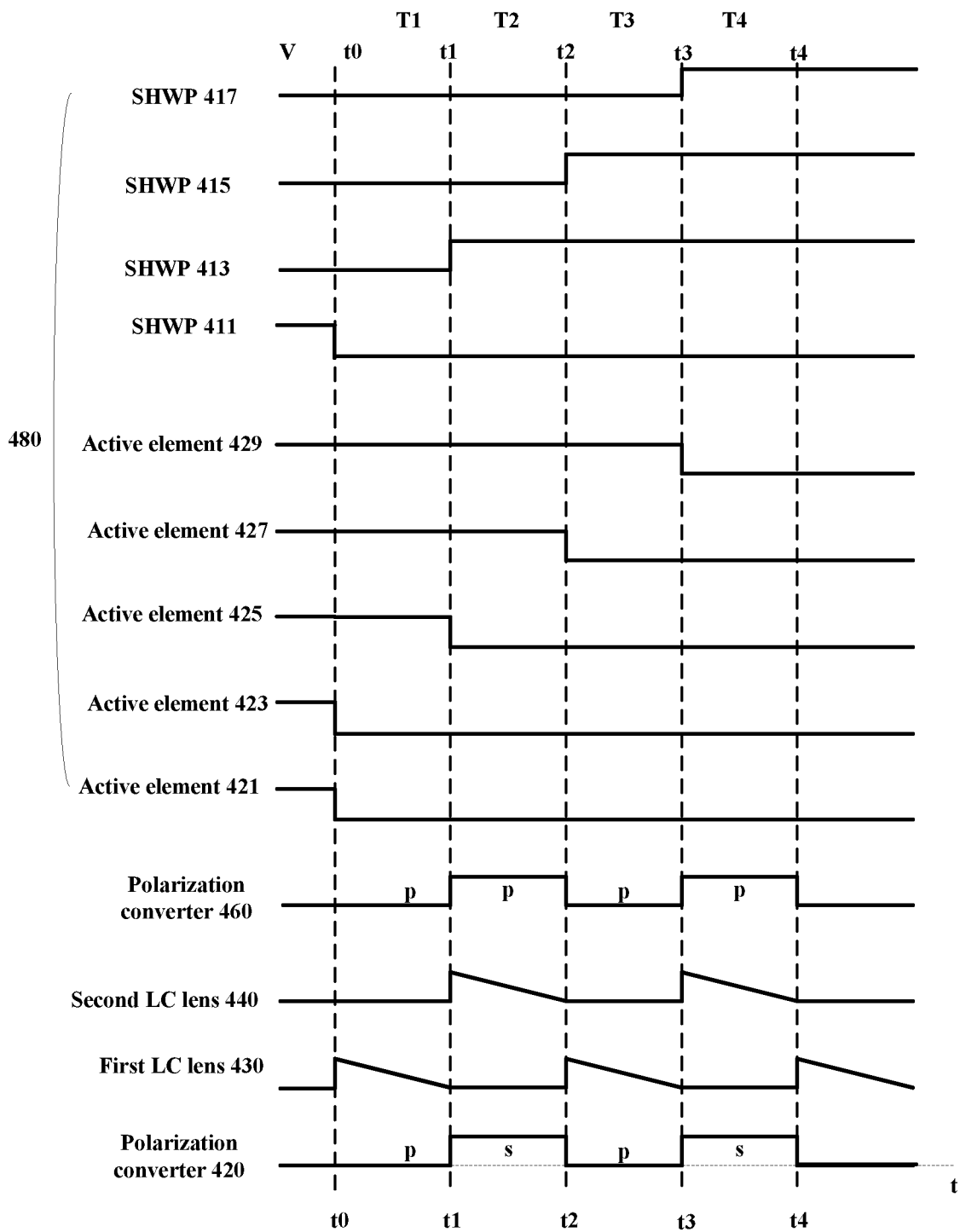
FIG. 6A is another example of a driving scheme of the varifocal structure in FIG. 4A, in accordance with an embodiment of the present disclosure.
Figures 6B, 6C:
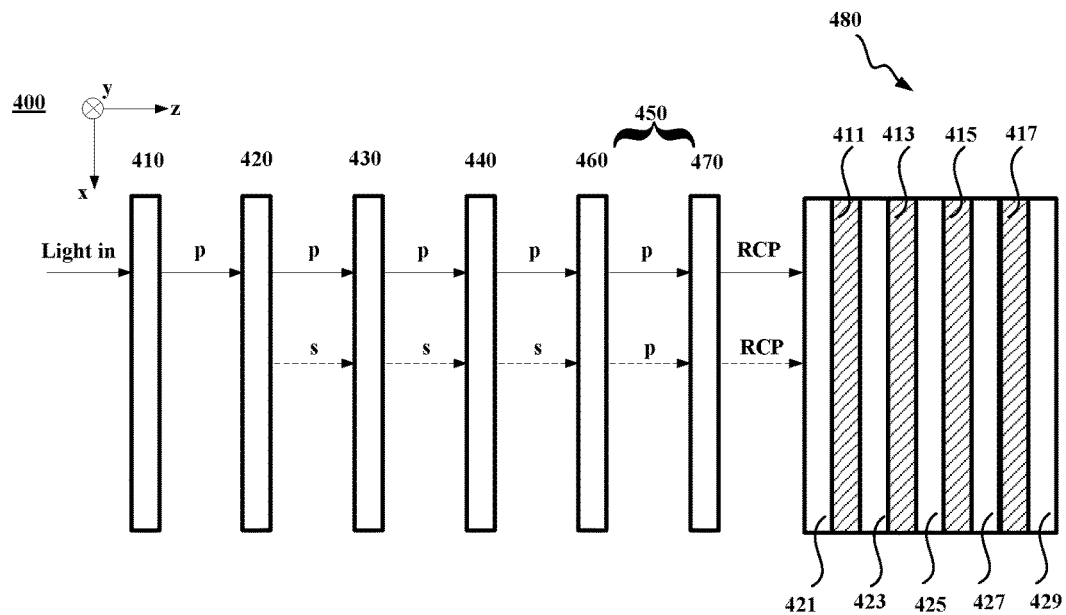
FIG. 6B is an example of an optical path of the varifocal structure having the driving scheme in FIG. 6A, in accordance with an embodiment of the present disclosure.
FIG. 6C is a table showing example optical adjustments in a negative range of the varifocal structure having the driving scheme in FIG. 6A, in accordance with an embodiment of the present disclosure.

FIG. 6A is another example of a driving scheme of the varifocal structure in FIG. 4A, in accordance with an embodiment; FIG. 6B is an example of an optical path of the varifocal structure having the driving scheme in FIG. 6A, in accordance with an embodiment; and FIG. 6C is a table showing example optical adjustments in the negative range of the varifocal structure having the driving scheme in FIG. 6A, in accordance with an embodiment. The horizontal axis and the vertical axis in FIG. 6A represent time and applied voltage to an element in the varifocal structure, respectively.

Referring to FIGS. 6A-6C, during T1 stage (t0≤t<t1), the polarization converter 420 may be non-active and output p-polarized light, the first LC lens 430 may be switched-on to provide continuous variable optical power from R to 0 as the applied voltage gradually decreases, the second LC lens 440 may be switched off. The polarization converter 460 included in the linear-to-circularly polarization converter 450 may be non-active and output p-polarized light, and the p-polarized light may be converted to right-handed circularly polarized (RCP) light after passing the quarter waveplate 470 included in the linear-to-circularly polarization converter 450. The active element (AE) 421 may receive the right-handed circularly polarized (RCP) light, thereby having the additive state to provide optical power of A.

The SHWPs 411, 413, 415 and 417 may be non-active without changing the handedness of the light incident thereon. The active element (AE) 423 may be in the subtractive state to provide an optical power of −R, and the other active elements (AE) 425, 427 and 429 may be in the neutral state (i.e., zero optical power). Thus, from 0 to t1, the total optical power of the varifocal structure 400 may be continuously adjusted from A to A−R as the voltage applied to the first LC lens 430 gradually decreases.

At the time point t1, the first LC lens 430 may be switched off, and the SHWP 411, 413, 415 and 417 may be non-active. The active element (AE) 421 may be in the additive state to provide optical power of A, and the active element (AE) 423 may be in the subtractive state to provide optical power of −R. Thus, at the time point t1, the varifocal structure 400 may have stable optical power of A−R.

During T2 stage (t1<t<t2), the polarization converter 420 may be active and output s-polarized light, the second LC lens 440 may be switched-on to provide continuous variable optical power from R to 0 as the applied voltage gradually decreases, and the first LC lens 430 may be switched off. The polarization converter 460 may be active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWP 411 may be non-active without changing the handedness of the light incident thereon. The active element (AE) 423 may be in the subtractive state to provide optical power of −R. The SHWP 413 may be active to change the handedness of the circularly light from right handedness to left handedness, and the active elements (AE) 425 may be in the subtractive state to provide optical power of −R. The active elements (AE) 427 and 429 may be in the neutral state (i.e., zero optical power), and the SHWP 415 and 417 may be non-active without changing the handedness of the light incident thereon. Thus, from t1 to t2, the total optical power of the varifocal structure may be continuously adjusted from A−R to A−2R as the voltage applied to the second LC lens 440 gradually decreases.

At the time point t2, the second LC lens 440 may be switched off, the SHWP 413 may be active, thereby changing the handedness of the circularly light from right handedness to left handedness. The active element (AE) 421 may be in the additive state to provide optical power of A, and the active elements (AE) 423 and 425 each may be in the subtractive state to provide optical power of −R. Thus, at the time point t2, the varifocal structure 400 may have stable optical power of A−2R.

During T3 stage (t2<t<t3), the polarization converter 420 may be non-active and output p-polarized light, the first LC lens 430 may be switched-on to provide continuous variable optical power from R to 0 as the applied voltage gradually decreases, the second LC lens 440 may be switched off. The polarization converter 460 may be non-active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWP 411 may be non-active without changing the handedness of the light incident thereon. The active element (AE) 423 may be in the subtractive state to provide optical power of −R. The SHWPs 413 and 415 may be active to change the handedness of the circularly light from right handedness to left handedness, and the active elements (AE) 425 and 427 each may be in the subtractive state to provide an optical power of −R. The active element (AE) 429 may be in the neutral state (i.e., zero optical power), and the SHWP 417 may be non-active without changing the handedness of the light incident thereon. Thus, from t2 to t3, the total optical power of the varifocal structure 400 may be continuously adjusted from A−2R to A−3R as the voltage applied to the first LC lens 430 gradually decreases.

At the time point t3, the first LC lens 430 may be switched off, the SHWPs 413 and 415 may be active, thereby changing the handedness of the circularly light from right handedness to left handedness. The active element (AE) 421 may be in the additive state to provide optical power of A, and the active elements (AE) 423, 425 and 427 each may be in the subtractive state to provide optical power of −R. Thus, at the time point t3, the varifocal structure 400 may have stable optical power of A−3R.

During T4 stage (t3<t<t4), the polarization converter 420 may be active and output s-polarized light, the second LC lens 440 may be switched-on to provide continuous variable optical power from R to 0 as the applied voltage gradually decreases, and the first LC lens 430 may be switched off. The polarization converter 460 may be active and output p-polarized light, which may be converted to right-handed circularly polarized (RCP) light after passing the quarter waveplate 470. The active element (AE) 421 may receive the right-handed circularly polarized (RCP) light, thereby having the additive state to provide optical power of A.

The SHWP 411 may be non-active without changing the handedness of the light incident thereon. The active element (AE) 423 may be active to provide an optical power of −R. The SHWPs 413, 415 and 417 may be active to change the handedness of the circularly light from right handedness to left handedness, and the active elements (AE) 425, 427 and 429 each may be in the subtractive state to provide an optical power of −R. Thus, from t3 to t4, the total optical power of the varifocal structure may be continuously adjusted from A−3R to A−4R as the voltage applied to the first LC lens 430 gradually decreases.

At the time point t4, the first LC lens 430 may be switched off, the SHWPs 413, 415 and 417 may be active, thereby changing the handedness of the circularly light from right handedness to left handedness. The active element (AE) 421 may be in the additive state to provide optical power of A, and the active elements (AE) 423, 425, 427 and 429 each may be in the subtractive state to provide optical power of −R. Thus, at the time point t4, the varifocal structure 400 may have stable optical power of A−4R.

Thus, from t0 to t4, the first LC lens 430, the second LC lens 440, and the stacked PBP LC lens structure 480 together may provide a continuous adjustment of optical power from A to A−4R for the varifocal structure 400.

Figure 7:
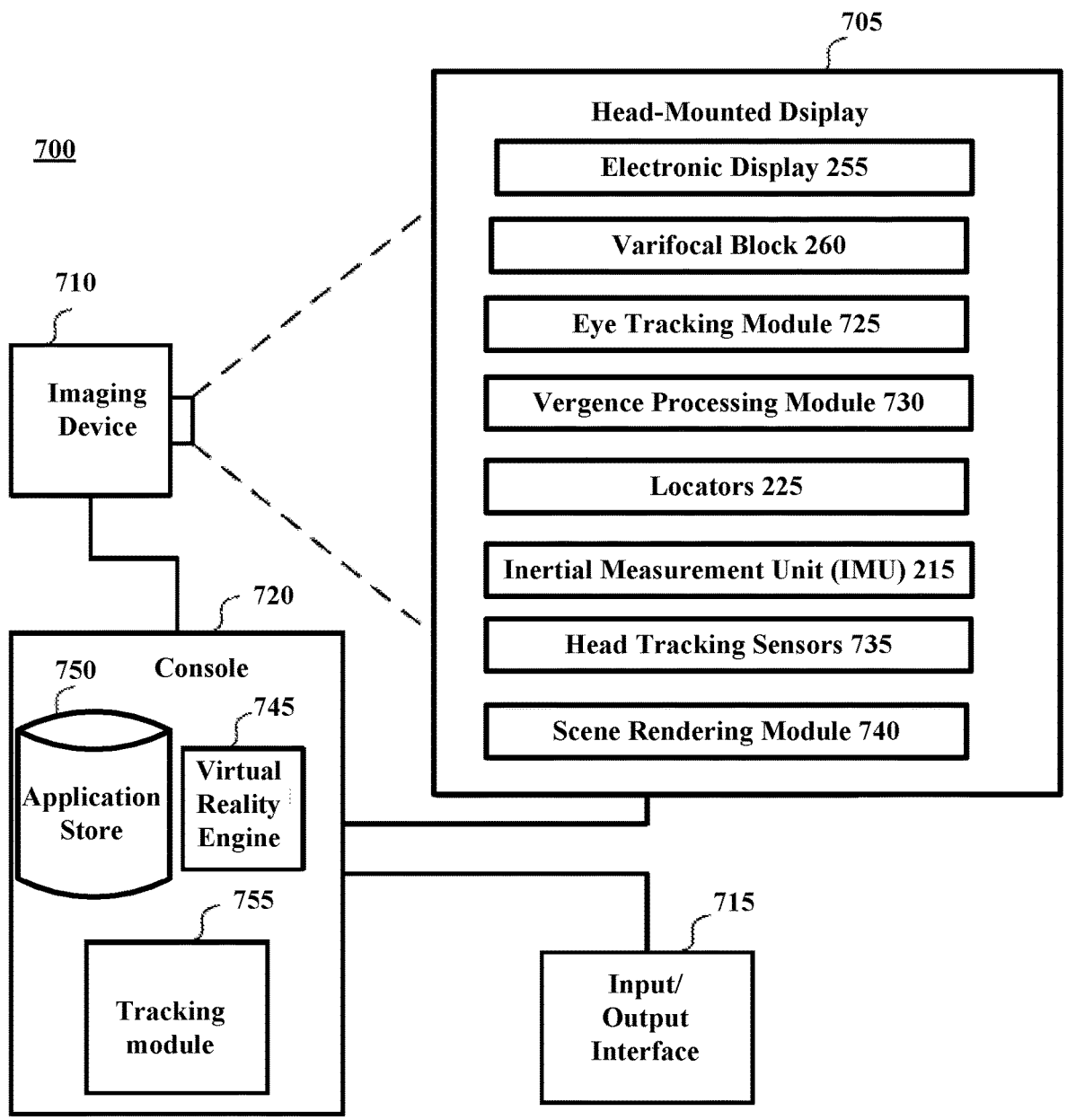
FIG. 7 is varifocal system in which a HMD operates, in accordance with an embodiment of the present disclosure.

FIG. 7 is varifocal system 700 in which a HMD 705 operates. The varifocal system 700 may be for use as a virtual reality (VR) system, an augmented reality (AR) system, a mixed reality (MR) system, or some combination thereof. As shown in FIG. 7, the varifocal system 700 may include a HMD 705, an imaging device 710, and an input interface 715, which are each coupled to a console 720. Although FIG. 7 shows a single HMD 705, a single imaging device 710, and a single input interface 715, in other embodiments, any number of these components may be included in the system. For example, there may be multiple HMDs 705 each having an associated input interface 715 and being monitored by one or more imaging devices 460, with each HMD 705, input interface 715, and imaging devices 460 communicating with the console 720. In alternative configurations, different and/or additional components may also be included in the varifocal system 700. The HMD 705 may act as a VR, AR, and/or a MR HMD. A MR and/or an AR HMD augments views of a physical, real-world environment with computer generated elements (e.g., images, video, sound, etc.).

The HMD 705 may present content to a user. In certain embodiments, the HMD 705 may be an embodiment of the HMD 200 described above with reference to FIGS. 2A and 2B. Example content includes images, video, audio, or some combination thereof. Audio content may be presented via a separate device (e.g., speakers and/or headphones) external to the HMD 705 that receives audio information from the HMD 705, the console 720, or both. The HMD 705 may include an electronic display 255 (described above with reference to FIG. 2B), a varifocal block 260 (described above with reference to FIG. 2B), an eye tracking module 725, a vergence processing module 730, one or more locators 225, an internal measurement unit (IMU) 215, head tracking sensors 735, and a scene rendering module 740.

The varifocal block 260 may adjust its focal length by adjusting a focal length of one or more varifocal structures. As noted above with reference to FIGS. 2B-6C, the varifocal block 260 adjusts its focal length by activating and/or deactivating a SHWP, controlling a state of a PBP LC lens, adjusting a first LC lens or a second LC lens, some combination thereof. The varifocal block 260 may adjust its focal length responsive to instructions from the console 720. Note that a varifocal tuning speed of a varifocal structure is limited by a tuning speed of the first and second LC lenses.

The eye tracking module 725 may track an eye position and eye movement of a user of the HMD 705. A camera or other optical sensor (that is part the eye tracking module 725) inside the HMD 705 may capture image information of a user's eyes, and eye tracking module 725 may use the captured information to determine interpupillary distance, interocular distance, a three dimensional (3D) position of each eye relative to the HMD 705 (e.g., for distortion adjustment purposes), including a magnitude of torsion and rotation (i.e., roll, pitch, and yaw) and gaze directions for each eye. In one example, infrared light may be emitted within the HMD 705 and reflected from each eye. The reflected light may be received or detected by the camera and analyzed to extract eye rotation from changes in the infrared light reflected by each eye. Many methods for tracking the eyes of a user may be used by eye tracking module 725. Accordingly, the eye tracking module 725 may track up to six degrees of freedom of each eye (i.e., 3D position, roll, pitch, and yaw), and at least a subset of the tracked quantities may be combined from two eyes of a user to estimate a gaze point (i.e., a 3D location or position in the virtual scene where the user is looking). For example, the eye tracking module 725 may integrate information from past measurements, measurements identifying a position of a user's head, and 3D information describing a scene presented by the electronic display 255. Thus, information for the position and orientation of the user's eyes is used to determine the gaze point in a virtual scene presented by the HMD 705 where the user is looking.

The vergence processing module 730 may determine a vergence depth of a user's gaze based on the gaze point or an estimated intersection of the gaze lines determined by the eye tracking module 725. Vergence is the simultaneous movement or rotation of both eyes in opposite directions to maintain single binocular vision, which is naturally and automatically performed by the human eye. Thus, a location where a user's eyes are verged is where the user is currently looking and is also typically the location where the user's eyes are currently focused. For example, the vergence processing module 730 may triangulate the gaze lines to estimate a distance or depth from the user associated with intersection of the gaze lines. Then the depth associated with intersection of the gaze lines may be used as an approximation for the accommodation distance, which identifies a distance from the user where the user's eyes are directed. Thus, the vergence distance may allow the determination of a location where the user's eyes should be focused.

The locators 225 may be objects located in specific positions on the HMD 705 relative to one another and relative to a specific reference point on the HMD 705. A locator 225 may be a light emitting diode (LED), a corner cube reflector, a reflective marker, a type of light source that contrasts with an environment in which the HMD 705 operates, or some combination thereof. Active locators 225 (i.e., an LED or other type of light emitting device) may emit light in the visible band (~380 nm to 750 nm), in the infrared (IR) band (~750 nm to 1 mm), in the ultraviolet band (~10 nm to 380 nm), some other portion of the electromagnetic spectrum, or some combination thereof.

The locators 225 may be located beneath an outer surface of the HMD 705, which is transparent to the wavelengths of light emitted or reflected by the locators 225 or is thin enough not to substantially attenuate the wavelengths of light emitted or reflected by the locators 225. Further, the outer surface or other portions of the HMD 705 may be opaque in the visible band of wavelengths of light. Thus, the locators 225 may emit light in the IR band while under an outer surface of the HMD 705 that is transparent in the IR band but opaque in the visible band.

The IMU 215 may be an electronic device that generates fast calibration data based on measurement signals received from one or more of the head tracking sensors 735, which generate one or more measurement signals in response to motion of HMD 705. Examples of the head tracking sensors 735 include accelerometers, gyroscopes, magnetometers, other sensors suitable for detecting motion, correcting error associated with the IMU 215, or some combination thereof. The head tracking sensors 735 may be located external to the IMU 215, internal to the IMU 215, or some combination thereof.

Based on the measurement signals from the head tracking sensors 735, the IMU 215 may generate fast calibration data indicating an estimated position of the HMD 705 relative to an initial position of the HMD 705. For example, the head tracking sensors 735 may include multiple accelerometers to measure translational motion (forward/back, up/down, left/right) and multiple gyroscopes to measure rotational motion (e.g., pitch, yaw, and roll). The IMU 215 may, for example, rapidly sample the measurement signals and calculate the estimated position of the HMD 705 from the sampled data. For example, the IMU 215 may integrate measurement signals received from the accelerometers over time to estimate a velocity vector, and integrate the velocity vector over time to determine an estimated position of a reference point on the HMD 705. The reference point may be a point that may be used to describe the position of the HMD 705. While the reference point may generally be defined as a point in space, in various embodiments, a reference point is defined as a point within the HMD 705 (e.g., a center of the IMU 630). Alternatively, the IMU 215 may provide the sampled measurement signals to the console 720, which determines the fast calibration data.

The IMU 215 may additionally receive one or more calibration parameters from the console 720. As further discussed below, the one or more calibration parameters may be used to maintain tracking of the HMD 705. Based on a received calibration parameter, the IMU 215 may adjust one or more of the IMU parameters (e.g., sample rate). In certain embodiments, certain calibration parameters may cause the IMU 215 to update an initial position of the reference point to correspond to a next calibrated position of the reference point. Updating the initial position of the reference point as the next calibrated position of the reference point may help to reduce accumulated error associated with determining the estimated position. The accumulated error, also referred to as drift error, may cause the estimated position of the reference point to "drift" away from the actual position of the reference point over time.

The scene rendering module 740 may receive content for the virtual scene from a VR engine 745, and provide the content for display on the electronic display 255. Additionally, the scene rendering module 740 may adjust the content based on information from the vergence processing module 730, the IMU 215, and the head tracking sensors 735. The scene rendering module 740 may determine a portion of the content to be displayed on the electronic display 255, based on one or more of the tracking module 755, the head tracking sensors 735, or the IMU 215, as described further below.

The imaging device 710 may generate slow calibration data in accordance with calibration parameters received from the console 720. Slow calibration data may include one or more images showing observed positions of the locators 225 that are detectable by imaging device 710. The imaging device 710 may include one or more cameras, one or more video cameras, other devices capable of capturing images including one or more locators 225, or some combination thereof. Additionally, the imaging device 710 may include one or more filters (e.g., for increasing signal to noise ratio). The imaging device 710 may be configured to detect light emitted or reflected from the locators 225 in a field of view of the imaging device 710. In embodiments where the locators 225 include passive elements (e.g., a retroreflector), the imaging device 710 may include a light source that illuminates some or all of the locators 225, which retro-reflect the light towards the light source in the imaging device 710. Slow calibration data may be communicated from the imaging device 710 to the console 720, and the imaging device 710 may receive one or more calibration parameters from the console 720 to adjust one or more imaging parameters (e.g., focal length, focus, frame rate, ISO, sensor temperature, shutter speed, aperture, etc.).

The input interface 715 may be a device that allows a user to send action requests to the console 720. An action request may be a request to perform a particular action. For example, an action request may be to start or end an application or to perform a particular action within the application. The input interface 715 may include one or more input devices. Example input devices include a keyboard, a mouse, a game controller, or any other suitable device for receiving action requests and communicating the received action requests to the console 720. An action request received by the input interface 715 may be communicated to the console 720, which performs an action corresponding to the action request. In certain embodiments, the input interface 715 may provide haptic feedback to the user in accordance with instructions received from the console 720. For example, haptic feedback may be provided by the input interface 715 when an action request is received, or the console 720 may communicate instructions to the input interface 715 causing the input interface 715 to generate haptic feedback when the console 720 performs an action.

The console 720 may provide content to the HMD 705 for presentation to the user in accordance with information received from the imaging device 710, the HMD 705, or the input interface 715. In one embodiment, as shown in FIG. 7, the console 720 may include an application store 750, a tracking module 755, and the VR engine 745. Certain embodiments of the console 720 have different or additional modules than those described in conjunction with FIG. 7. Similarly, the functions further described below may be distributed among components of the console 720 in a different manner than is described here.

The application store 750 may store one or more applications for execution by the console 720. An application may be a group of instructions, that when executed by a processor, generates content for presentation to the user. Content generated by an application may be in response to inputs received from the user via movement of the HMD 705 or the input interface 715. Examples of applications include gaming applications, conferencing applications, video playback application, or other suitable applications.

The tracking module 755 may calibrate the varifocal system 700 using one or more calibration parameters and may adjust one or more calibration parameters to reduce error in determining position of the HMD 705. For example, the tracking module 755 may adjust the focus of the imaging device 710 to obtain a more accurate position for observed locators 225 on the HMD 705. Moreover, calibration performed by the tracking module 755 may also account for information received from the IMU 215. Additionally, when tracking of the HMD 705 is lost (e.g., imaging device 710 loses line of sight of at least a threshold number of locators 225), the tracking module 755 may re-calibrate some or all of the varifocal system 700 components.

Additionally, the tracking module 755 may track the movement of the HMD 705 using slow calibration information from the imaging device 710, and determine positions of a reference point on the HMD 705 using observed locators from the slow calibration information and a model of the HMD 705. The tracking module 755 may also determine positions of the reference point on the HMD 705 using position information from the fast calibration information from the IMU 215 on the HMD 705. Additionally, the tracking module 755 may use portions of the fast calibration information, the slow calibration information, or some combination thereof, to predict a future location of the HMD 705, which is provided to the VR engine 745.

The VR engine 745 may execute applications within the varifocal system 700 and receives position information, acceleration information, velocity information, predicted future positions, or some combination thereof for the HMD 705 from the tracking module 755. Based on the received information, the VR engine 745 may determine content to provide to the HMD 705 for presentation to the user, such as a virtual scene, one or more virtual objects to overlay onto a real world scene, etc.

In certain embodiments, the VR engine 745 may maintain focal capability information of the varifocal block 260. Focal capability information is information that describes what focal distances are available to the varifocal block 260. Focal capability information may include, e.g., a range of focus that the varifocal block 260 is able to accommodate (e.g., 0 to 4 diopters); combinations of settings for SHWPs (e.g., active or non-active), active PBP LC lenses, and first and second liquid tunable lenses LC lenses that map to particular focal planes; combinations of settings for PBP LC lenses and first and second LC lenses that map to particular focal planes; settings for first and second LC lenses that map to particular focal planes; or some combination thereof.

The VR engine 745 may generate instructions for the varifocal block 260, the instructions causing the varifocal block 260 to adjust its focal distance to a particular location. The VR engine 745 may generate the instructions based on focal capability information and, e.g., information from the vergence processing module 730, the IMU 215, and the head tracking sensors 735. The VR engine 745 may use the information from the vergence processing module 730, the IMU 215, and the head tracking sensors 735, or some combination thereof, to select a focal plane to present content to the user. The VR engine 745 may then use the focal capability information to determine settings for one or SHWPs, one or more active PBP LC lenses, the first and second LC lenses, or some combination thereof, within the varifocal block 260 that are associated with the selected focal plane. The VR engine 745 may generate instructions based on the determined settings, and provide the instructions to the varifocal block 260.

Additionally, the VR engine 745 may perform an action within an application executing on the console 720 in response to an action request received from the input interface 715, and provide feedback to the user that the action was performed. The provided feedback may be visual or audible feedback via the HMD 705 or haptic feedback via VR input interface 715.

Figure 8:
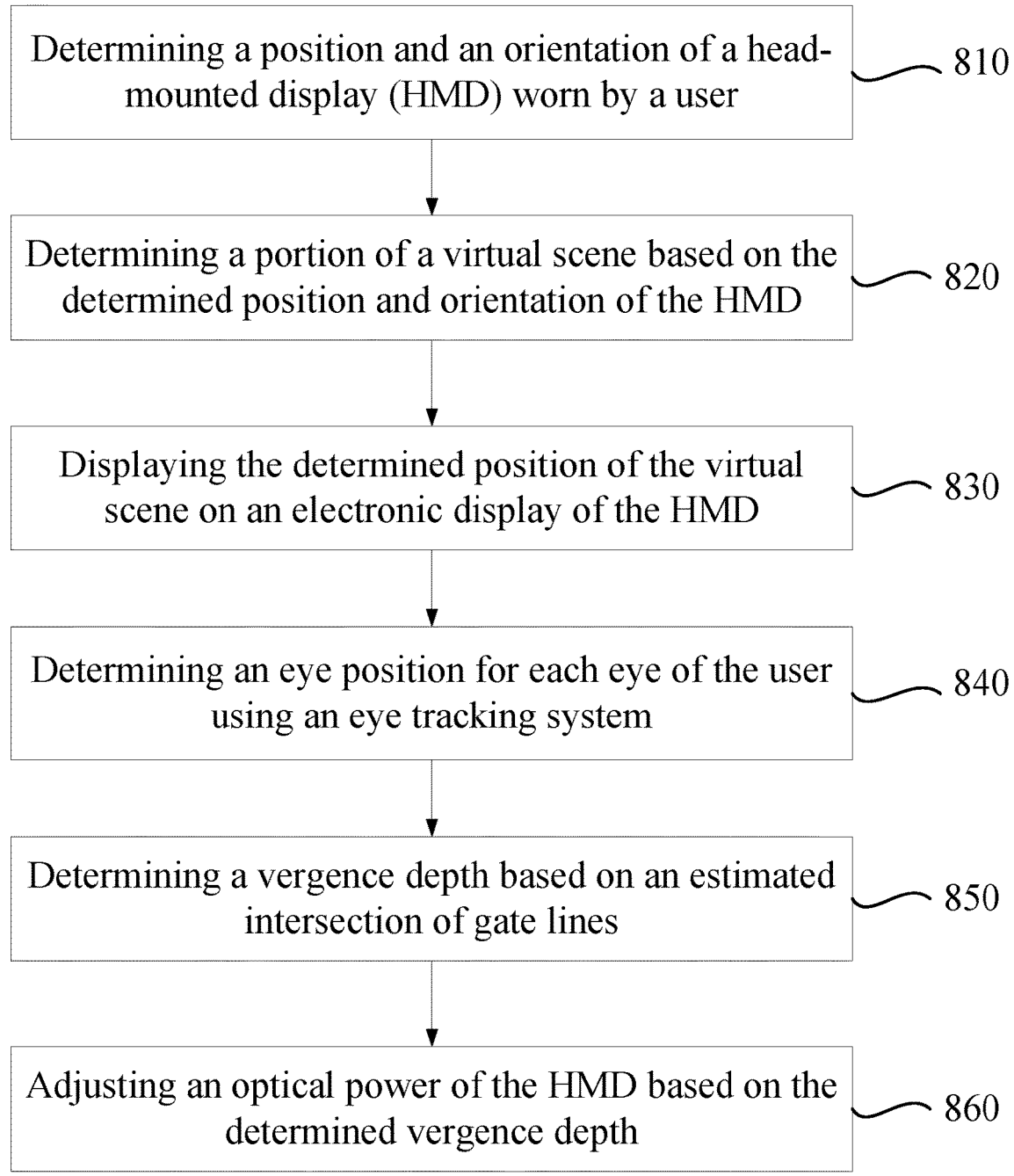
FIG. 8 is a process for mitigating vergence-accommodation conflict by adjusting the focal length of a HMD, in accordance with an embodiment of the present disclosure.

FIG. 8 is a process 800 for mitigating vergence-accommodation conflict by adjusting the focal length of an HMD 705, in accordance with an embodiment. The process 800 may be performed by the varifocal system 700 in certain embodiments. Alternatively, other components may perform some or all of the steps of the process 800. For example, in certain embodiments, a HMD 705 and/or a console (e.g., console 720) may perform some of the steps of the process 800. Additionally, the process 800 may include different or additional steps than those described in conjunction with FIG. 8 in certain embodiments or perform steps in different orders than the order described in conjunction with FIG. 8. Additionally, the process 800 may include different or additional steps than those described in conjunction with FIG. 8 in certain embodiments or perform steps in different orders than the order described in conjunction with FIG. 8.

As discussed above in FIG. 7, the varifocal system 700 may dynamically vary its focus to bring images presented to a user wearing the HMD 200 into focus, which keeps the user's eyes in a zone of comfort as vergence and accommodation change. Additionally, eye tracking in combination with the variable focus of the varifocal system 700 may allow blurring to be introduced as depth cues in images presented by the HMD 200.

As shown in FIGS. 7-8, the varifocal system 700 may determine a position, an orientation, and/or a movement of HMD 705 (Step 810). The position may be determined by a combination of the locators 225, the IMU 215, the head tracking sensors 735, the imagining device 710, and the tracking module 755, as described above in conjunction with FIG. 7.

The varifocal system 700 may determines a portion of a virtual scene based on the determined position and orientation of the HMD 705 (Step 820). The varifocal system 700 may map a virtual scene presented by the HMD 705 to various positions and orientations of the HMD 705. Thus, a portion of the virtual scene currently viewed by the user may be determined based on the position, orientation, and movement of the HMD 705.

The varifocal system 700 may display the determined portion of the virtual scene being on an electronic display (e.g., the electronic display 255) of the HMD 705 (Step 830). In certain embodiments, the portion may be displayed with a distortion correction to correct for optical error that may be caused by the image light passing through the varifocal block 260. Further, the varifocal block 260 may activate/deactivate one or more SHWPS, PBP LC lenses, first or second LC lenses, or some combination thereof, to provide focus and accommodation to the location in the portion of the virtual scene where the user's eyes are verged.

The varifocal system 700 may determine an eye position for each eye of the user using an eye tracking system (Step 840). The varifocal system 700 may determine a location or an object within the determined portion at which the user is looking to adjust focus for that location or object accordingly. To determine the location or object within the determined portion of the virtual scene at which the user is looking, the HMD 705 may track the position and location of the user's eyes using image information from an eye tracking system (e.g., eye tracking module 725). For example, the HMD 705 may track at least a subset of a 3D position, roll, pitch, and yaw of each eye, and use these quantities to estimate a 3D gaze point of each eye.

Figure 9:
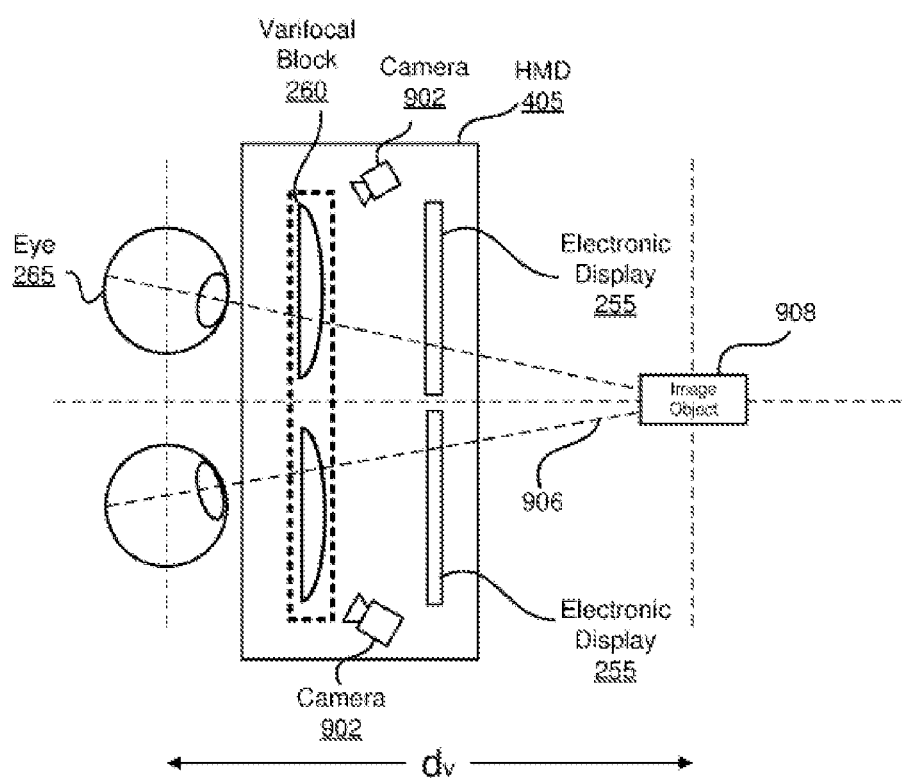
FIG. 9 shows an example process for mitigating vergence-accommodation conflict by adjusting a focal length of a varifocal block that includes varifocal structures, in accordance with an embodiment of the present disclosure.

The varifocal system 700 may determine a vergence depth based on an estimated intersection of gaze lines (Step 850). For example, FIG. 9 shows a cross section of an embodiment of the HMD 705 that includes camera 902 for tracking a position of each eye 265, the electronic display 255, and the varifocal block 260 that includes two varifocal structures, as described with respect to FIG. 2B. As swoon in FIG. 9, the camera 902 may capture images of the user's eyes looking at an image object 908, and the eye tracking module 725 may determine an output for each eye 265 and gaze lines 906 corresponding to the gaze point or location where the user is looking based on the captured images. Accordingly, vergence depth (dv) of the image object 908 (also the user's gaze point) may be determined 850 based on an estimated intersection of the gaze lines 906. As shown in FIG. 9, the gaze lines 906 may converge or intersect at the distance dv, where the image object 908 is located. In certain embodiments, information from past eye positions, information describing a position of the user's head, and information describing a scene presented to the user may also be used to estimate the 3D gaze point of an eye in various embodiments.

Returning to FIG. 8, the varifocal system 700 may adjust an optical power of the HMD 705 based on the determined vergence depth (Step 860). The varifocal system 700 may select a focal plane that matches the vergence depth by controlling one or more SHWPs, one or more PBP LC lenses, first and/or second LC lenses, or some combination thereof. As described above, the optical power of the varifocal block 260 may be adjusted to change a focal distance of the HMD 705 to provide accommodation for the determined vergence depth corresponding to where or what in the displayed portion of the virtual scene the user is currently looking.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device, comprising:
   a first-type liquid crystal (LC) lens configured to provide a first optical power that is variable in a first step resolution;
   a second-type LC lens coupled with the first-type LC lens, and configured to provide a second optical power that is variable in a second step resolution; and
   a linear-to-circular polarization converter disposed between the first-type LC lens and the second-type LC lens,
   wherein the linear-to-circular polarization converter is configured to convert a linearly polarized light output from the first-type LC lens into a circularly polarized light propagating toward the second-type LC lens,
   wherein the first step resolution is smaller than the second step resolution, and
   wherein a total optical power of the device is a sum of the first optical power and the second optical power, and is variable in the first step resolution.

2. The device of claim 1, wherein an adjustment range of the first optical power is equal to or larger than the second step resolution.

3. The device of claim 1, wherein the second-type LC lens includes a Pancharatnam Berry Phase (PBP) LC lens.

4. A device, comprising:
   a first-type liquid crystal (LC) lens configured to provide a first optical power that is variable in a first step resolution; and
   a second-type LC lens coupled with the first-type LC lens, and configured to provide a second optical power that is variable in a second step resolution,
   wherein the first step resolution is smaller than the second step resolution,
   wherein a total optical power of the device is a sum of the first optical power and the second optical power, and is variable in the first step resolution, and
   wherein the second-type LC lens includes a plurality of PBP LC lenses and a plurality of switchable half waveplate alternately arranged.

5. A device, comprising:
   a first-type liquid crystal (LC) lens configured to provide a first optical power that is variable in a first step resolution; and
   a second-type LC lens coupled with the first-type LC lens, and configured to provide a second optical power that is variable in a second step resolution,
   wherein the first step resolution is smaller than the second step resolution,
   wherein a total optical power of the device is a sum of the first optical power and the second optical power, and is variable in the first step resolution,
   wherein the first-type LC lens includes a first LC lens and a second LC lens arranged in optical series,
   wherein the first LC lens is configured to provide the first optical power for a linearly polarized light having a first polarization direction, and
   wherein the second LC lens is configured to provide the first optical power for a linearly polarized light having a second polarization direction that is orthogonal to the first polarization direction.

6. The device of claim 5, wherein the first LC lens and the second LC lens are alternately operated in a switched-on state to provide the first optical power.

7. The device of claim 5, further comprising:
   a first polarization converter, the first-type LC lens being disposed between the first polarization converter and the second-type LC lens,
   wherein the first polarization converter is switchable between outputting the linearly polarized light having the first polarization direction and outputting the linearly polarized light having the second polarization direction toward the first-type LC lens.

8. The device of claim 7, wherein the first polarization converter includes a switchable half waveplate.

9. The device of claim 7, further comprising:
   a second polarization converter disposed between the first-type LC lens and the second-type LC lens,
   wherein the second polarization converter is a linear-to-circular polarization converter configured to convert the linearly polarized light having the first or second polarization direction output from the first-type LC lens into a circularly polarized light having a same predetermined handedness propagating toward the second-type LC lens.

10. The device of claim 9, wherein the second polarization converter further comprises:
    a switchable half waveplate disposed between the first-type LC lens and the second-type LC lens; and
    a waveplate disposed between the second polarization converter and the second-type LC lens.

* * * * *